March 3, 1931. E. P. BULLARD, JR 1,794,441
VERTICAL TURRET LATHE
Filed Feb. 29, 1928 14 Sheets-Sheet 8

INVENTOR.
Edward P. Bullard, Jr.
BY
Chamberlain & Newman
ATTORNEYS.

March 3, 1931.  E. P. BULLARD, JR  1,794,441
VERTICAL TURRET LATHE
Filed Feb. 29, 1928  14 Sheets-Sheet 9

INVENTOR.
Edward P. Bullard, Jr.
BY
ATTORNEYS.
Chamberlain & Newman

March 3, 1931. E. P. BULLARD, JR 1,794,441
VERTICAL TURRET LATHE
Filed Feb. 29, 1928 14 Sheets-Sheet 10

INVENTOR.
Edward P. Bullard, Jr.
BY
ATTORNEYS.
Chamberlain + Newman

March 3, 1931. E. P. BULLARD, JR 1,794,441
VERTICAL TURRET LATHE
Filed Feb. 29, 1928 14 Sheets-Sheet 11
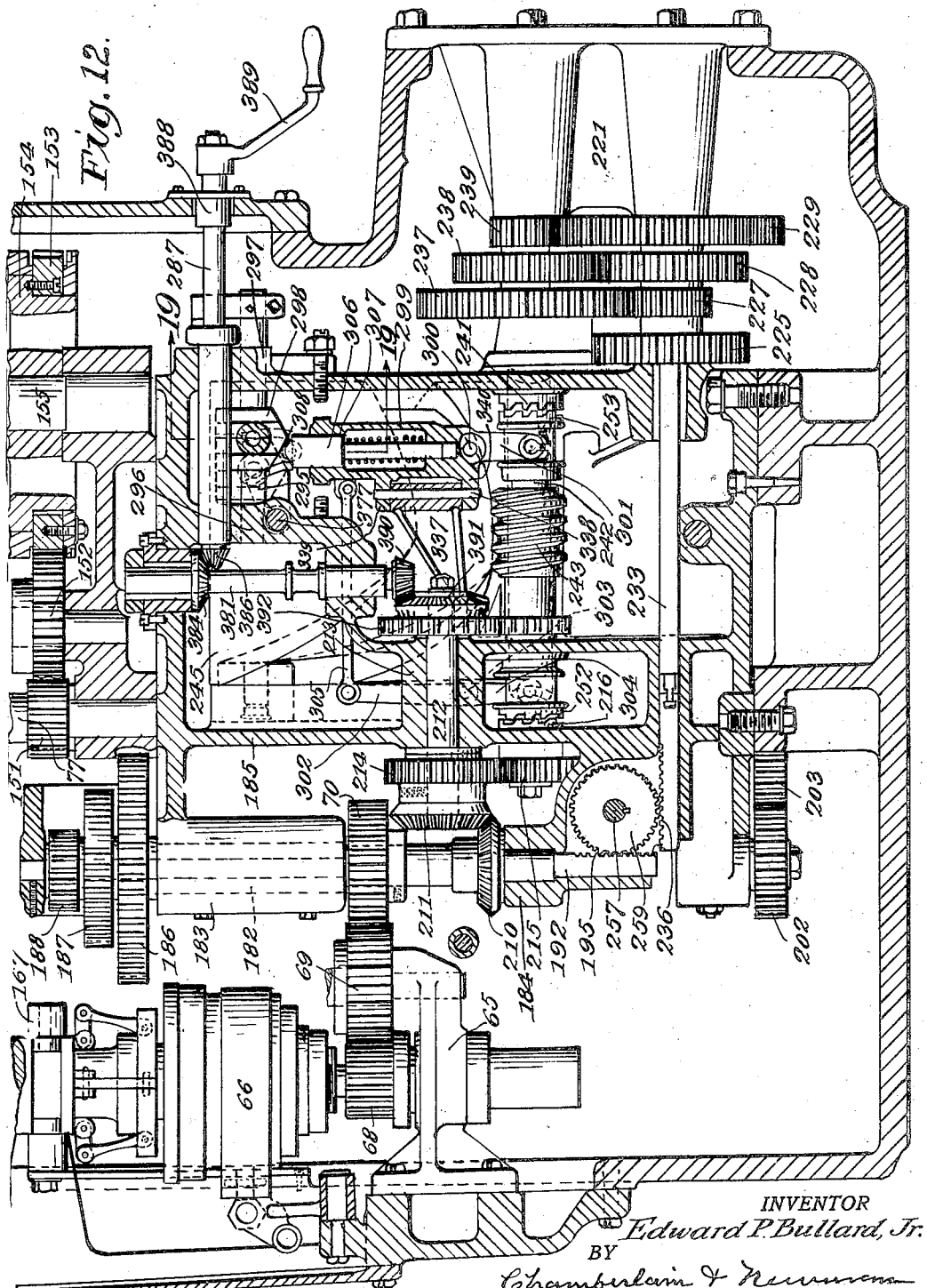
INVENTOR
Edward P. Bullard, Jr.
BY
Chamberlain & Newman
ATTORNEYS

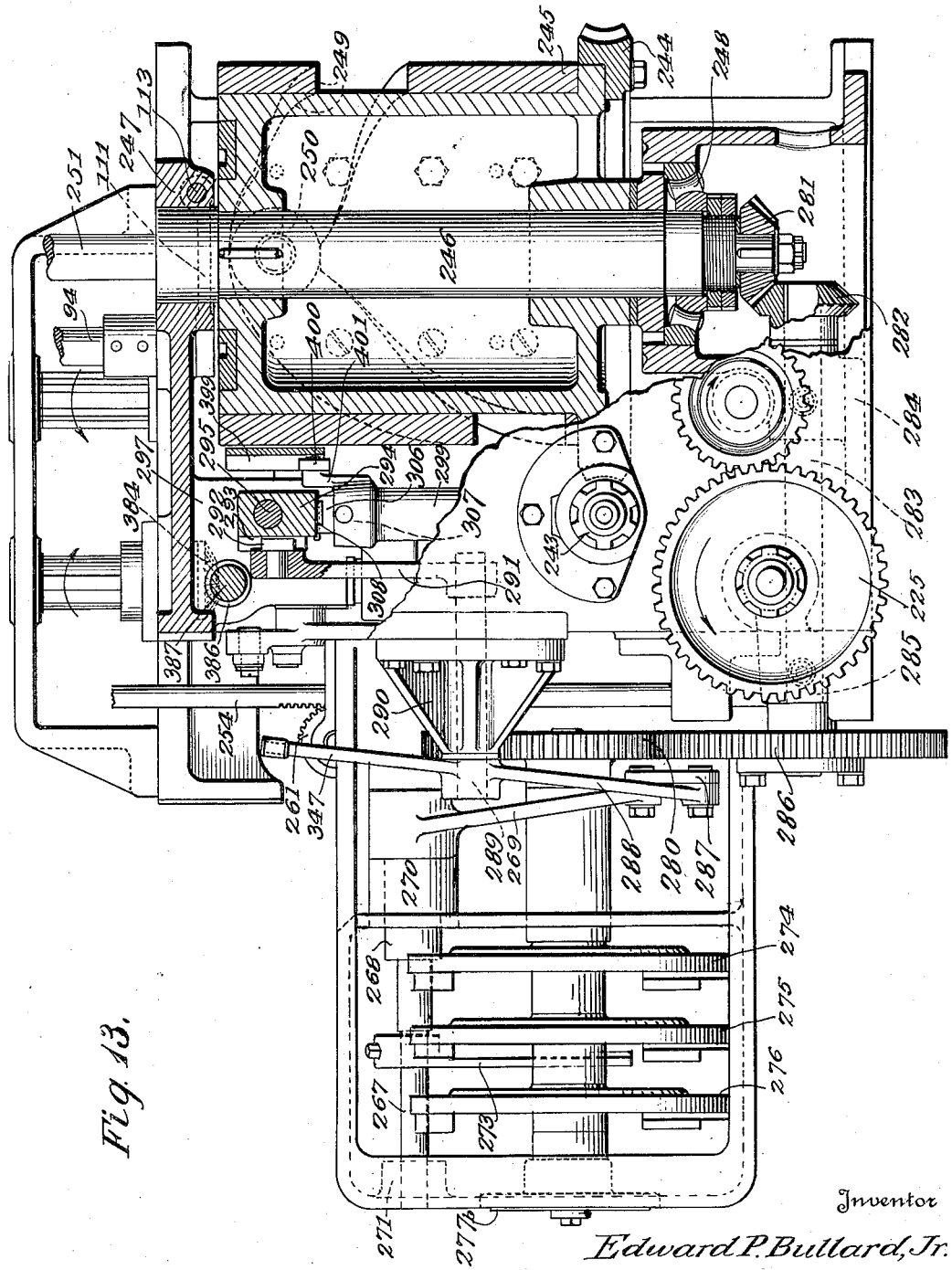

March 3, 1931. E. P. BULLARD, JR 1,794,441
VERTICAL TURRET LATHE
Filed Feb. 29, 1928 14 Sheets-Sheet 13
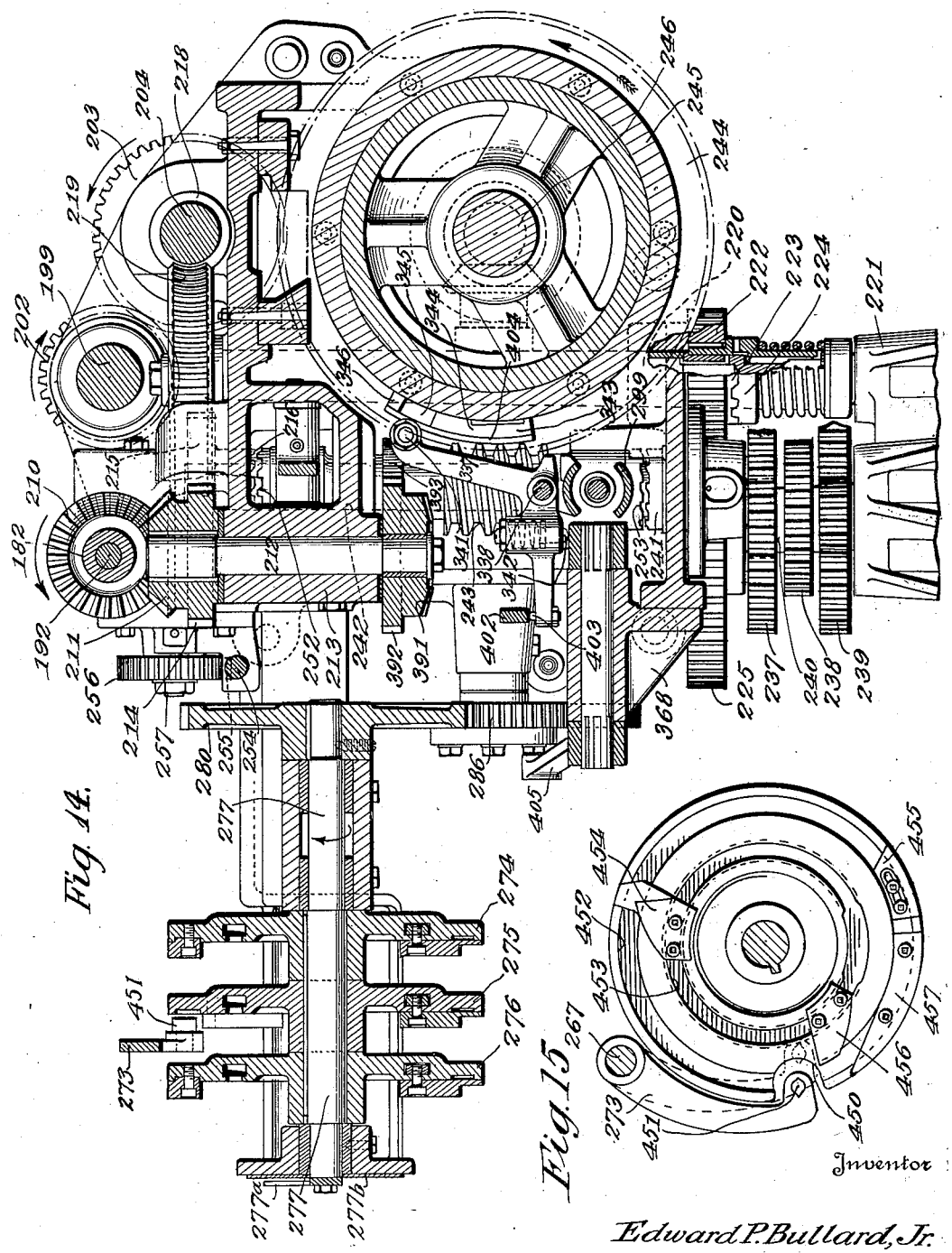
Inventor
*Edward P. Bullard, Jr.*
By *Chamberlain & Newman*
Attorneys March 3, 1931.  E. P. BULLARD, JR  1,794,441
VERTICAL TURRET LATHE
Filed Feb. 29, 1928   14 Sheets-Sheet 14
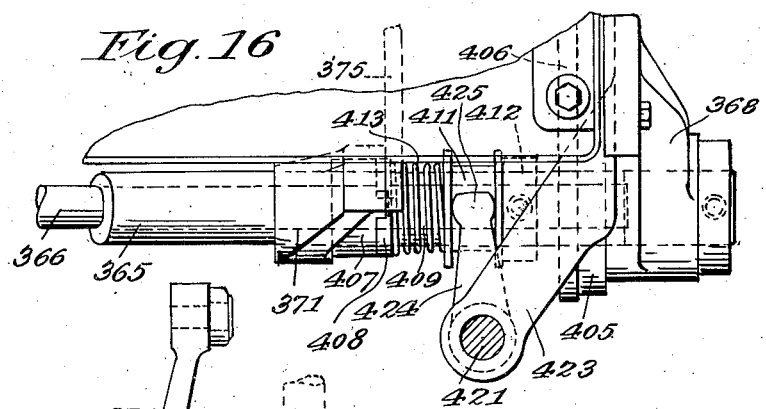
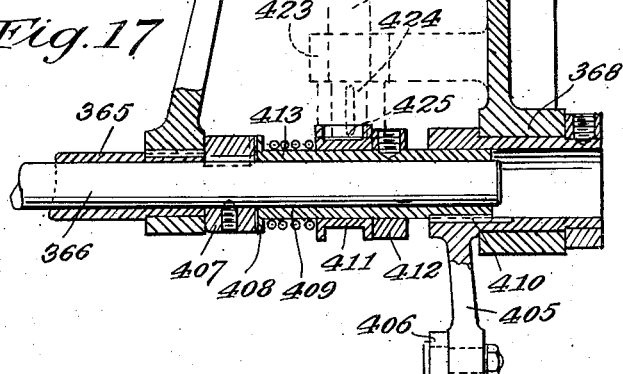
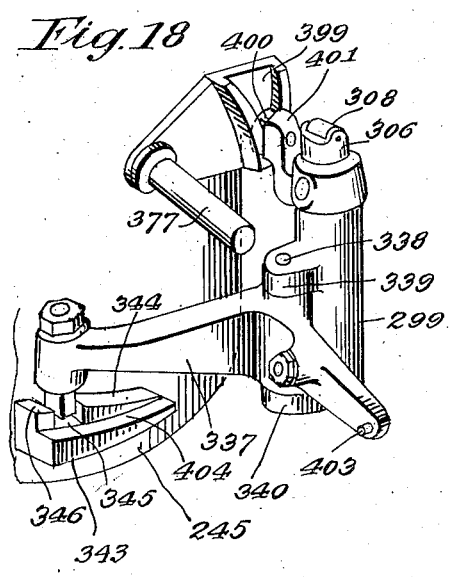
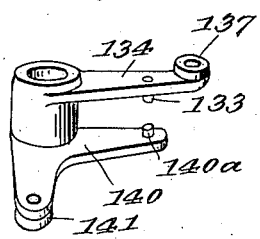
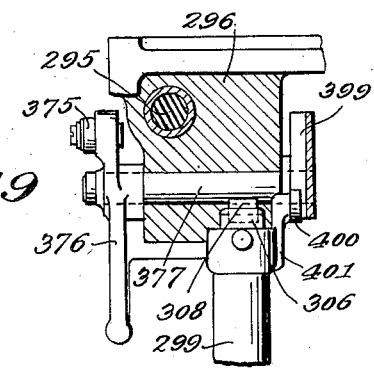
INVENTOR
Edward P. Bullard, Jr.
BY
Chamberlain & Newman
ATTORNEYS.

Patented Mar. 3, 1931

1,794,441

UNITED STATES PATENT OFFICE

EDWARD P. BULLARD, JR., OF STRATFORD, CONNECTICUT, ASSIGNOR TO THE BULLARD COMPANY, OF BRIDGEPORT, CONNECTICUT, A CORPORATION OF CONNECTICUT

VERTICAL TURRET LATHE

Application filed February 29, 1928. Serial No. 257,839.

The present invention relates to an automatic machine tool, and has for an object to provide a machine tool in which a series of machining operations may be successively performed by a plurality of tools of different speed and feed characteristics, and in which the rotation of the work and the feed and speed of the tools will be automatically controlled and regulated throughout the cycle of operation of the machine. It is proposed in the present embodiment to provide a single work spindle and a turret on an axis parallel to the work spindle and carrying one or more tool carrying heads adapted to be independently fed at selective rates of feed and at any desired angle to the work. A further object is to provide selective speed and feed means by which any of the tool heads may be independently fed at a predetermined feed and speed, and the work rotated at predetermined speeds individual to the separate tool heads. Other objects are to provide improved indexing means and control means for the tool feed works controlled and regulated thereby, and further to provide means whereby any one of the tool heads may be operated independently of the cycle and fed either manually or by power feed.

With the above and other objects in view, an embodiment of the invention is shown in the accompanying drawings, and this embodiment will be hereinafter more fully described with reference thereto, and the invention will be finally pointed out in the claims.

In the drawings:—

Fig. 12 is a vertical sectional view of the feed works, and showing the clutch operating and hand feed mechanism.

Fig. 13 is a view of the feed works, partly in section, and partly in elevation, and at right angles to the view shown in Fig. 11.

Fig. 14 is a horizontal sectional view of the feed works.

Fig. 15 is a detail elevation of one of the feed works tool feed control cams.

Fig. 16 is a detail plan view of the safety clutch means of the hand operated clutch tripping means for manual control of the feed works.

Fig. 17 is a vertical sectional view thereof.

Fig. 18 is a perspective view of the feed works clutch operating mechanism, and associated means.

Fig. 19 is a sectional detail view taken along the line 19—19 of Fig. 12.

Fig. 20 is a detail perspective view of the cam operated lever for operating the turret locking means.

Similar reference characters indicate corresponding parts throughout the several figures of the drawings.

Figure 1:
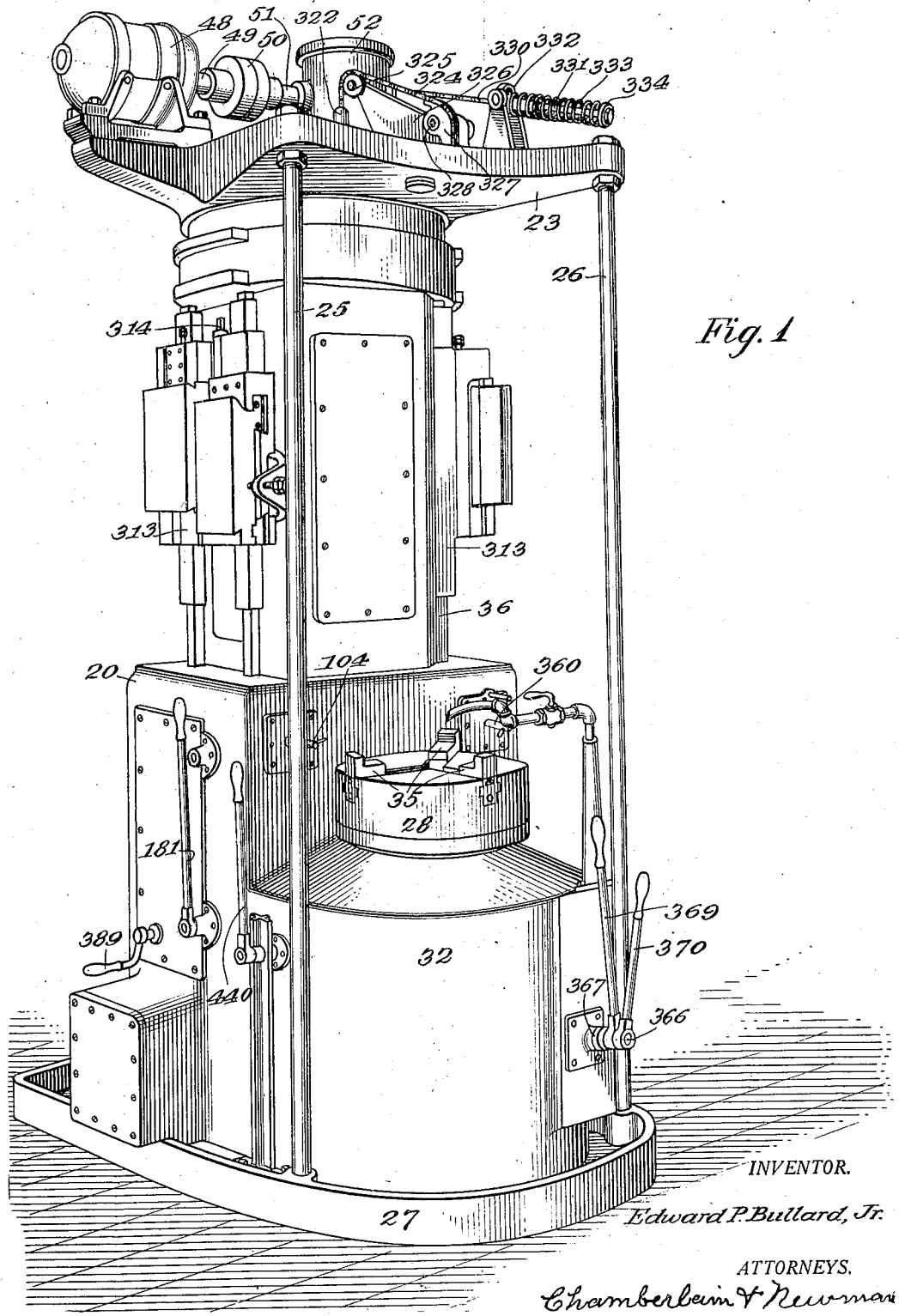
Fig. 1 is a perspective view of the improved automatic machine tool according to the present embodiment of the invention.

Referring to the drawings the automatic machine tool, according to the present embodiment of the invention, comprises a main frame consisting of a base 20 upon the upper side of the raised rearward portion of which an upright pedestal 21 is secured by bolts 22, and upon the upper end of which a motor supporting head 23 is secured by bolts 24, the forwardly projecting corners of the head being rigidly connected by vertical posts 25 and 26 to the flanged rim 27 of the base.

The work carrying chuck 28 has its spindle 29, (Fig. 3) mounted in a flanged bearing 30 secured in an opening 31 in the forward table portion 32 of the base, the lower end of the spindle 29 being suitably journaled in a bearing housing 33 secured within the base by bolts 34, and within which the mechanism hereinafter more fully referred to, for operating the chuck jaws 35, is housed.

Figure 5:
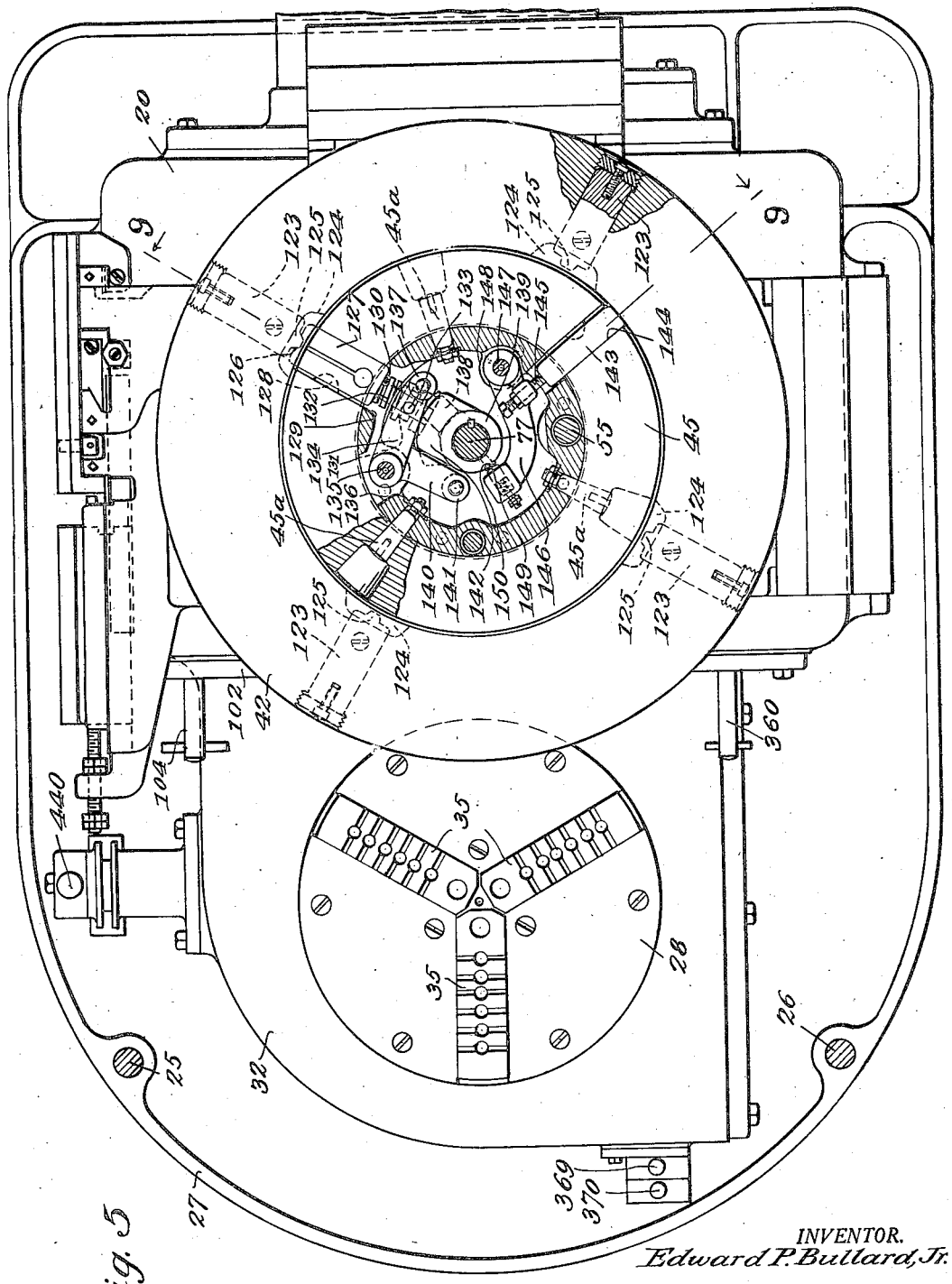
Fig. 5 is a sectional plan view taken along the line 5—5 of Fig. 3.
Figure 6:
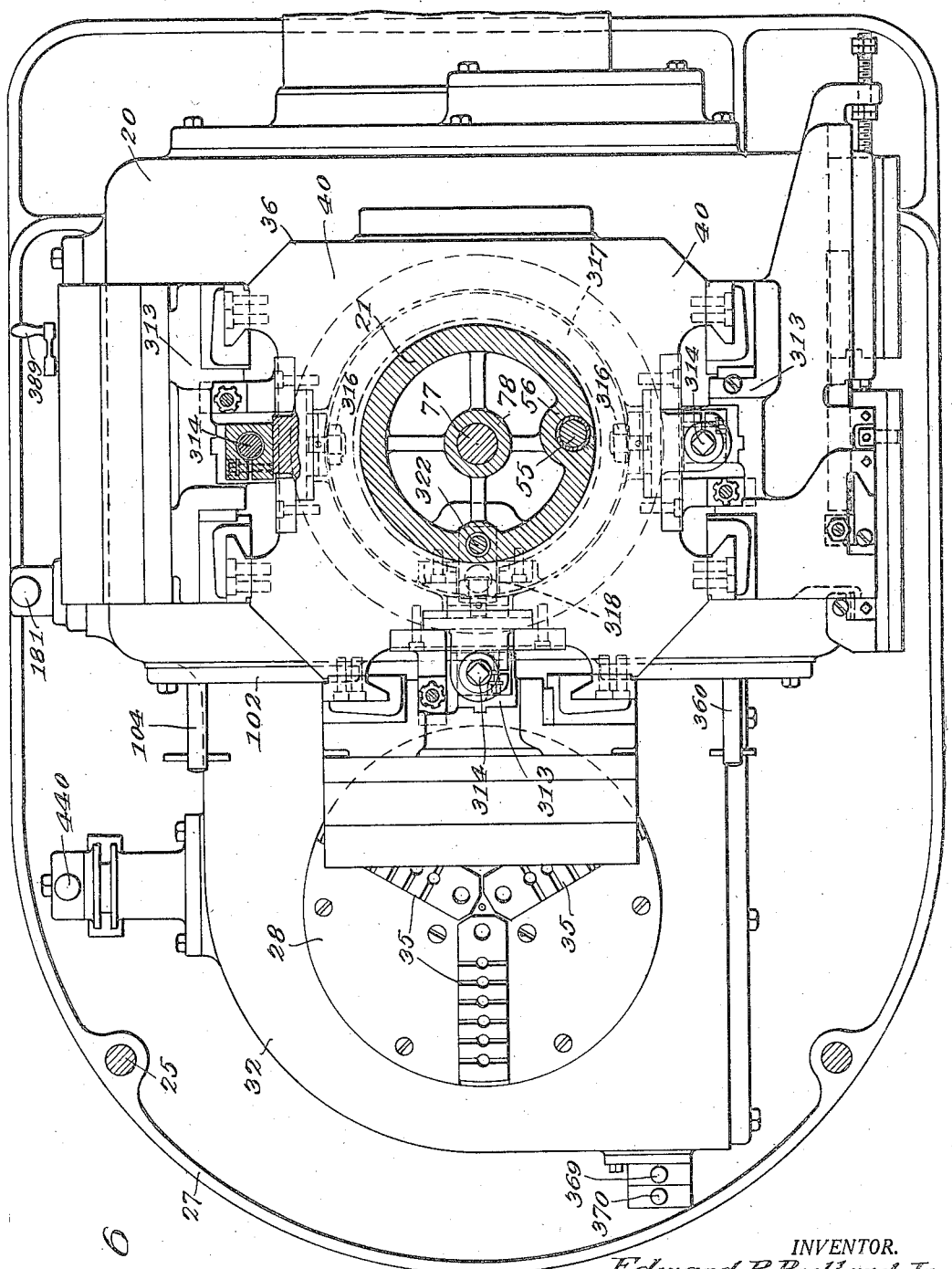
Fig. 6 is a sectional plan view taken along the line 6—6 of Fig. 3.

The tool carrying frame 36, which is adapted to have its several faces successively indexed into relation with the work carrying chuck, is rotatable about the pedestal 21, its lower end being mounted upon roller bearings 37 disposed diagonally between an inner flange 38 of the frame 36 and a base flange 39 of the pedestal. At its upper end the frame 36 is provided with an inwardly extending bearing flange 40 having bearing upon a cylindrical bearing portion 41 of the pedestal. An annular indexing head 42 is secured by bolts 43 to the upper end of the frame 36 beneath the head 23, and is provided with an inner annular recess 44 in which a collar 45 secured upon the upper end of the pedestal 21 by radially disposed dowel bolts 45ª (Figs. 3 and 5) is disposed, an adjustable lock ring 46 being screwed upon the upper end of the collar and engaging an annular recess 47 of the index head to retain the vertical position of the frame upon the pedestal. The indexing means hereinafter more fully referred to, is disposed at the upper side of the indexing head 42.

The main driving motor 48, (Fig. 2) is mounted upon the head 23, its horizontal shaft 49 being coupled at 50 to a horizontal shaft 51 journaled in a gear box 52, and provided within said gear box with a bevel pinion 53 meshing with a bevel gear 54 provided upon the upper end of a vertical drive shaft 55, journaled at its intermediate portion in an elongated bearing 56 provided partially in the head 23 and partially in the pedestal 21, and journaled at its lower end in a bearing 57 formed upon the base of said pedestal 21.

The shaft 55 is provided within the pedestal 21 with a pinion 58 adapted through gearing, hereinafter referred to, to drive the indexing mechanism and the automatic work table and tool speed control and main clutch operating cam, and at its lower end is provided with a pinion 59 adapted, through means, hereinafter referred to, to drive the work table and tool operating means. The pinion 59 meshes with an idler gear 60, journaled in a suitable bearing 61, and which in turn meshes with a gear 62 provided at the upper end of the main clutch shaft 63, journaled in an upper bearing 64 and a lower bearing 65. The main clutch 66, which is preferably of the friction disc type is mounted on the shaft 63 and is adapted through actuation of the clutch collar 67 to provide a driving connection between said shaft and a pinion 68 mounted on said shaft.

Figure 10:
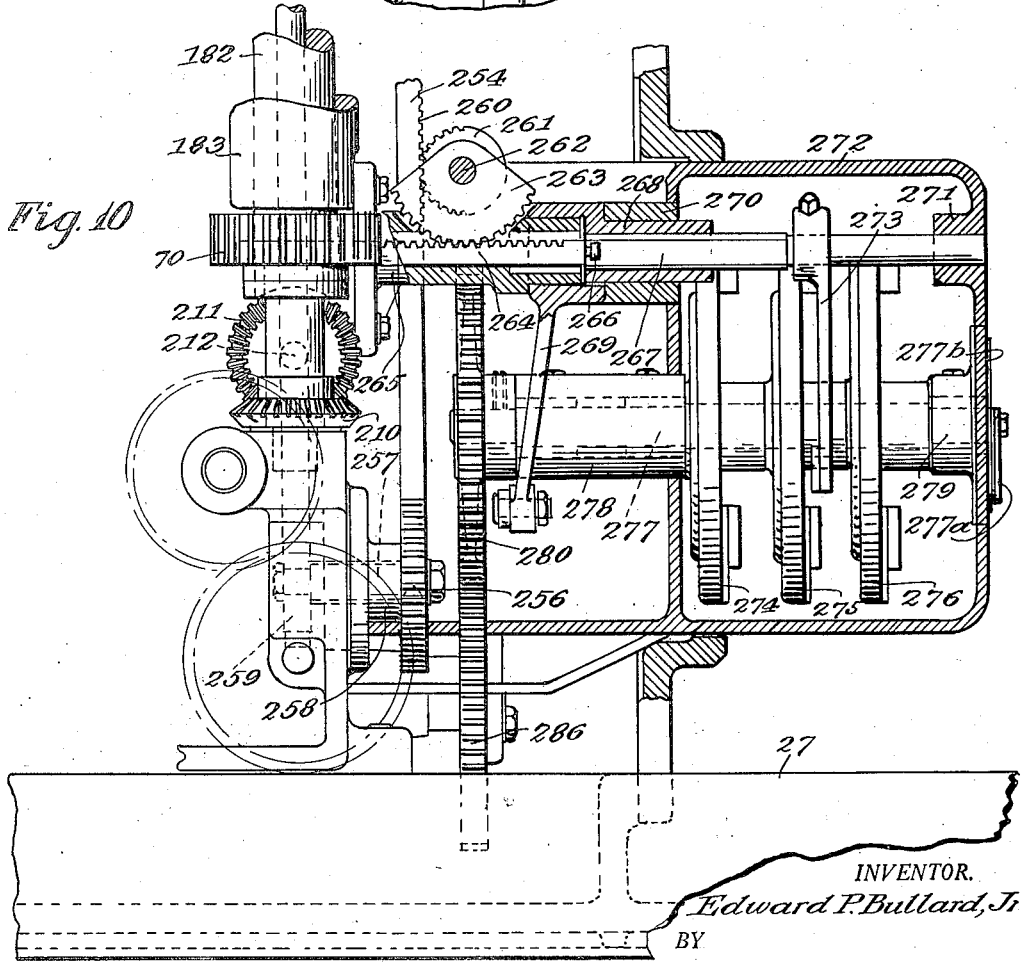
Fig. 10 is a detail vertical sectional view of part of the feed works and showing the clutch operating cams for the fast and slow speed tool head feed.
Figure 11:
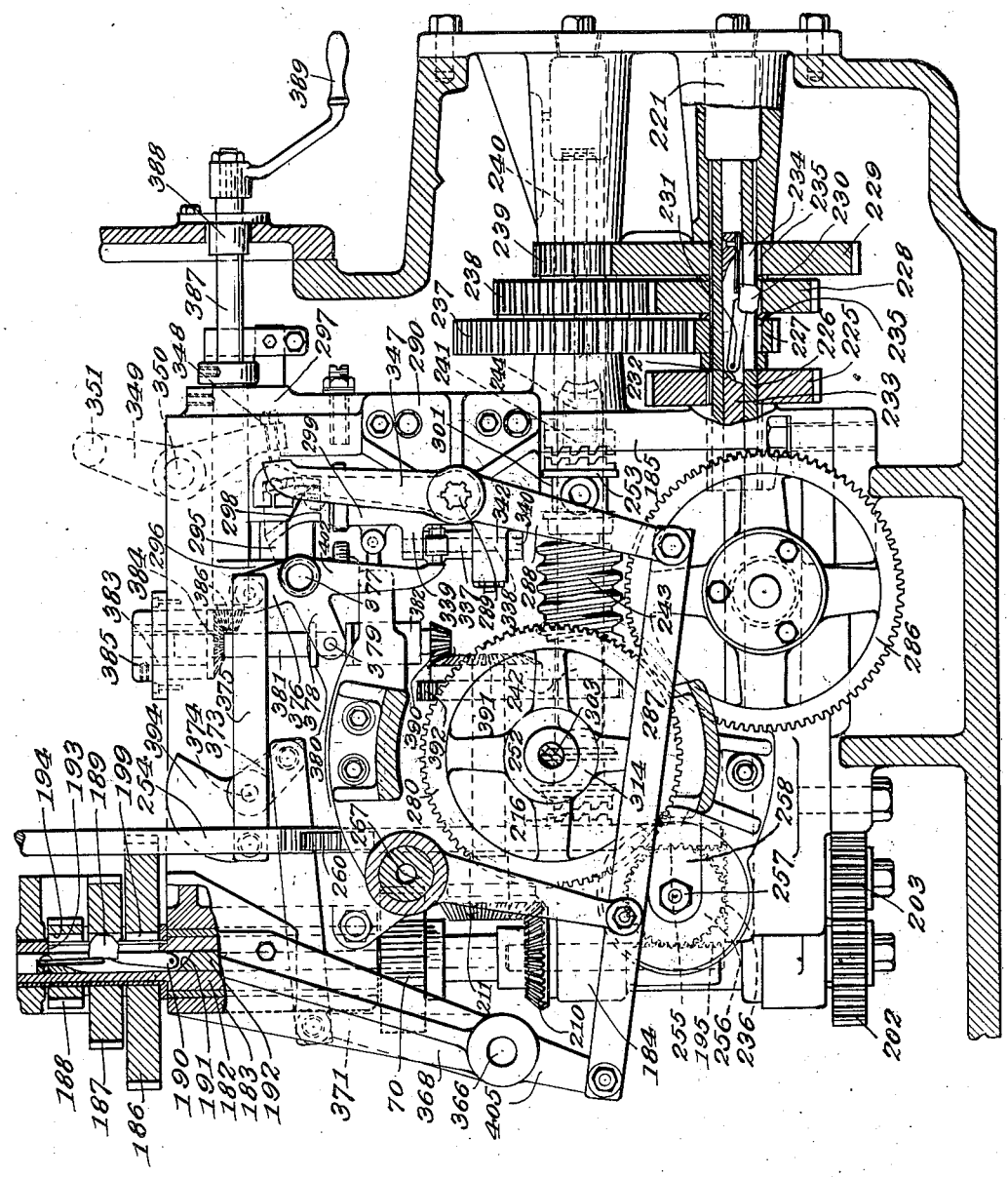
Fig. 11 is a view partly in vertical section, and partly in elevation of the feed works.

The pinion 68 meshes with an idler 69, which in turn meshes with a gear 70 (Figs. 2, 10 and 11), and which is adapted to drive the work carrying chuck and tool feeding mechanism, hereinafter more fully referred to.

Figure 3:
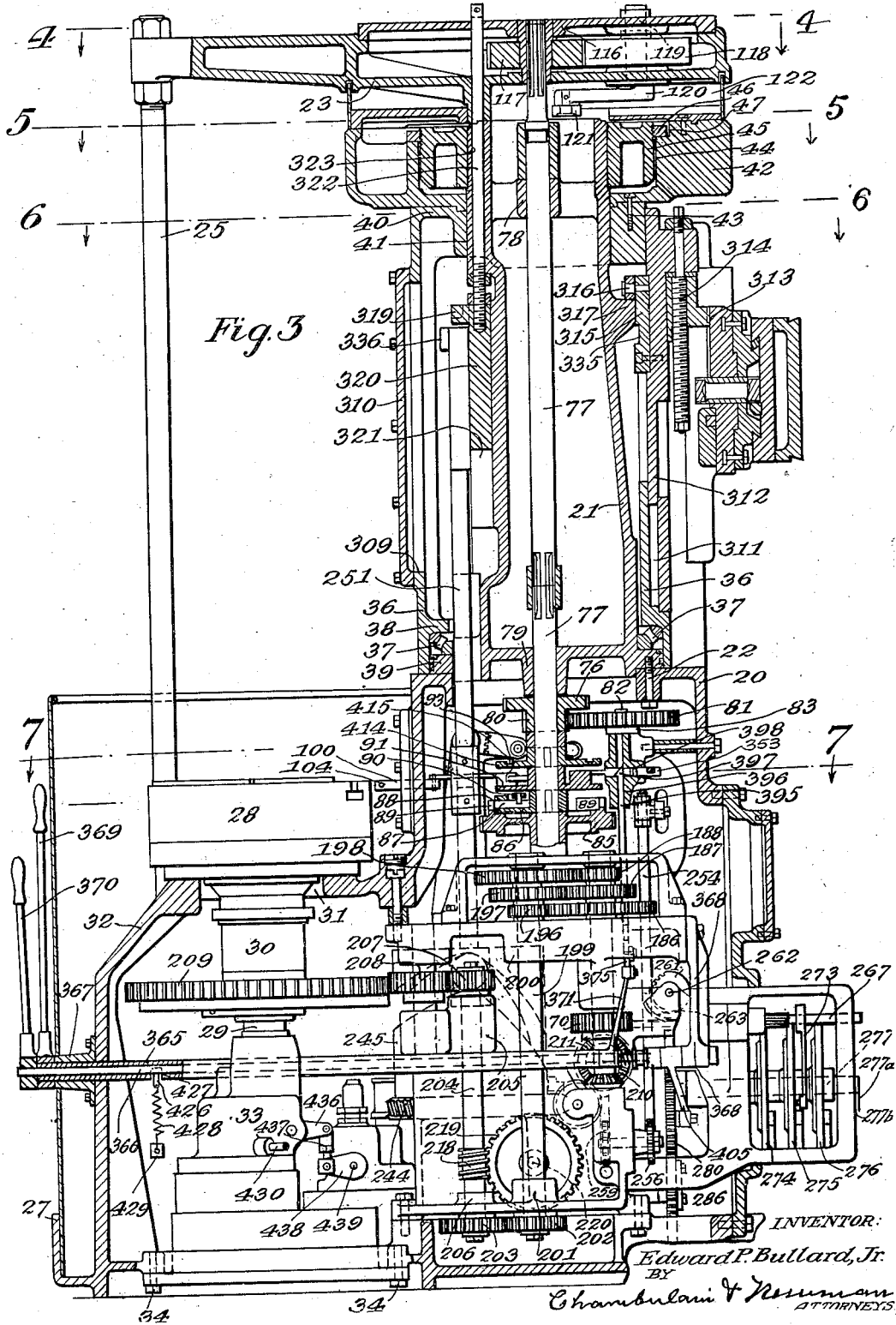
Fig. 3 is a vertical sectional view taken along the line 3—3 of Fig. 4.
Figure 8:
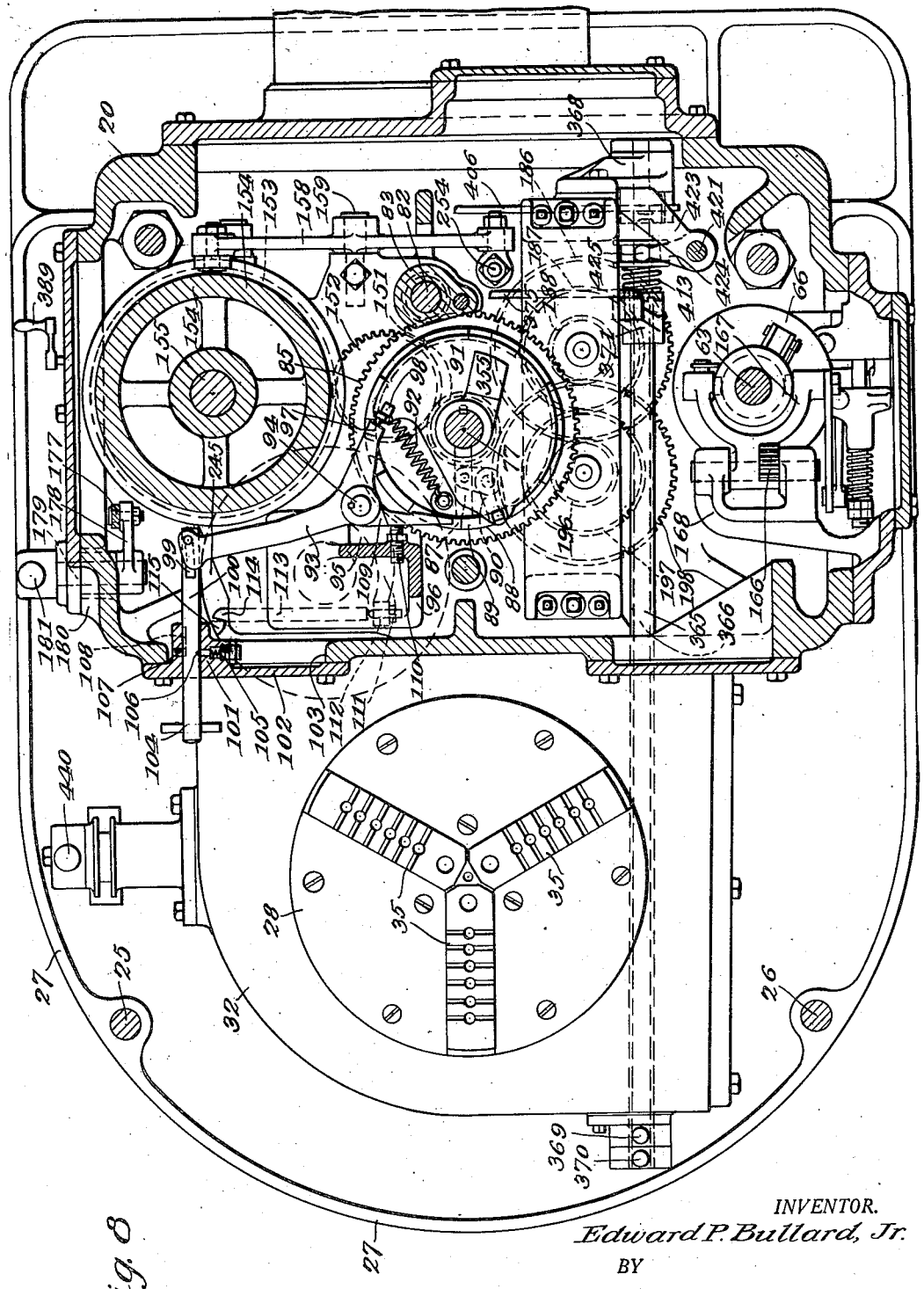
Fig. 8 is a sectional plan view taken along the line 8—8 of Fig. 2.

The pinion 58 of the drive shaft 55 meshes with a gear 71 rotatably mounted on a vertical counter-shaft 72 journaled in a bearing support 73 formed upon the base of the pedestal 21, and adapted to rotate said counter-shaft through a spring pressed ratchet collar 74 keyed thereto, this connection adapted in the event of a jamming of the machine to permit continued rotation of the gears 58 and 71 without danger of damaging the machine. At the lower end of the shaft 72 there is provided a pinion 75, which meshes with a gear 76, loosely rotatable on the vertical indexing shaft 77, journaled in upper and lower bearing portions 78 and 79 of the pedestal 21 (Fig. 3). The gear 76 has a pinion 80 formed thereon at its under side, which meshes with a large gear 81 provided upon the upper end of a vertical shaft 82 journaled in a bearing 83 and provided at its lower end with a pinion 84 which meshes with a large gear 85 loosely rotatable on the index shaft 77. At the upper side of the gear 85 a clutch plate 86 is keyed to the index shaft and is provided with a radially movable locking bolt 87 (Figs. 3 and 8), adapted to be projected and retracted to engage and disengage one of the notches 88 provided in an upstanding circumferential flange 89, formed upon the upper side of the gear 85, to thereby impart rotation from the gear 85 to the indexing shaft. The bolt is adapted to be actuated by means of a bell-crank lever 90 pivoted upon the plate 86, connected at one end to the bolt and at its other end to a plate 91 disposed above the plate 86, and loosely rotatable upon the indexing shaft. The plate 91 is connected by a spring 92 to the plate 86 which normally tends to draw said plate 91 in a counter-clockwise direction, thereby turning the bell-crank 90 to project the bolt 87 into driving relation with the gear 85.

In this relation the gear 85 and plate 91 rotate as a unit, but by obstructing the rotation of the plate 91 a relative reverse movement occurs between them which causes retraction of the bolt 87, and stoppage of the indexing shaft. An index release lever 93 has its vertical shaft 94 journaled in a bearing 95 of a mounting frame 96 secured within the base, one end portion 97 of this lever being normally disposed in the path of a stop block 98 provided on the plate 91. The other end of the lever is connected to the slotted end 99 of a pull-rod 100, slidable in a bearing 101, of a plate 102 secured over an opening 103 in the front wall of the base, the rod having a handle 104 at its outer end. A spring pressed plunger 105 engaging a retool positions, which are adapted to disconnect the clutch at the completion of the indexing operation, and during which disconnected relation the cam groove 156 functions to position the speed control means. This being done the cam groove 157 again connects the clutch. In indexing through the loading and unloading station the clutch remains disconnected, there being no cam rise 157ᵃ in relation to this position. There is, however, a cut out 157ᵇ which permits hand operation of the clutch in this position, so that the operator may rotate the work table to determine whether the work is properly chucked.

As just pointed out, the clutch is adapted to be hand operated, and for this purpose the lever 160 is provided with a segment gear 169 which meshes with a gear 170 provided upon a shaft 171 journaled at one end in the bearing bracket 163. At its other end it is journaled in a yoke member 172, rotatably mounted in a bearing 173 provided in a cover plate 174, and is provided with a projecting rib 175 disposed in spaced relation between the two legs of the yoke member. This mechanism is such that movement of the yoke member in one or the other directions will rotate the gear 170 and operate the clutch to connect or disconnect it while the automatic operation of the lever 160 and gear 170 will not impart movement to the yoke while the latter is in its normally neutral position. The yoke member is provided with a lever arm 176 which is connected by a link 177 to a lever arm 178 mounted on a shaft 179 journaled in a bearing 180 of the cover plate 124 and provided at the outer side of said plate with a hand lever 181.

The gear 70 (Figs. 10 to 14) driven by the main clutch gear 68, is mounted upon a vertical tubular shaft 182 having bearing in bearing portions 183 and 184 of the feed works frame 185, and upon the upper end of this shaft there are loosely mounted a series of different diameter gears 186, 187 and 188, any one of which is adapted to be selectively keyed to the shaft by means of a spring pressed key 189 pivotally mounted at 190 within a slot 191 in the upper end of a slide rod 192 engaged in the passage of the shaft, the key adapted to be projected through a slot 193 in the shaft into engagement with the key slots 194 of said gears 186, 187 and 188, depending upon the position of vertical adjustment of the slide rod. The slide rod projects at its lower end below the shaft 182 and is provided with rack teeth 195 adapted to cooperate with mechanism, hereinafter more fully referred to, to automatically position said slide rod.

The gears 186, 187 and 188 respectively mesh with a series of gears 196, 197 and 198, keyed upon the upper end of a vertical shaft 199, journaled in bearings 200 and 201 of the frame 185, and provided at its lower end with a gear 202, which meshes with a gear 203 provided upon the lower end of a vertical shaft 204 journaled in bearings 205 and 206 of the frame.

A gear 207 is provided at the upper end of the shaft 204, which meshes with an idler gear 208, and which in turn meshes with the large gear 209 of the work table spindle. The work table is thus adapted to be selectively rotated at three different speeds, that is at a particular speed for each of the three work operations of the machine. Upon the shaft 182 there is secured a bevel pinion 210, which meshes with a bevel pinion 211 secured upon the end of a horizontally disposed shaft 212 journaled in a bearing 213 of the frame, said pinion 211 having a spur gear 214 formed thereon which meshes with a gear 215 secured upon a clutch member 216 rotatably mounted upon one end of a worm and clutch supporting shaft 242, and upon which the worm presently to be described, for driving the tool slide feeding cam is mounted. The gear 215 and clutch member 216 are the fast speed or traverse driving means for the tool slides. The slow feed or working speed driving means will now be described.

Upon the shaft 204 there is provided a worm 218 which drives a worm gear 219 provided upon one end of a horizontal shaft 220, journaled in the frame 185, and having its other end projecting therefrom and journaled in a bearing frame 221. A gear 222 is loosely mounted on the shaft 220 between the frame 185 and said bearing frame 221 and is provided with ratchet teeth 223 engaged by a spring pressed ratchet clutch collar 224 slidably keyed upon said shaft, and adapted upon rotation in one direction to rotate said gear and in the other direction to ratchet free of said gear. Reverse rotation of the work table spindle, therefore, does not impart movement to the gear 222 and the tool feed mechanism driven thereby. The gear 222 meshes with a gear 225 keyed upon a tubular shaft 226 journaled in the bearing frames 185 and 221, and upon this shaft there are loosely mounted three different diameter gears 227, 228 and 229, any one of which is adapted to be selectively connected to the shaft by means of a spring pressed key 230, pivotally mounted at 231 within a slot 232 in the end of a slide rod 233, engaged in the passage of the shaft, said key being projected through a slot 234 in the shaft and adapted to engage the key slot 235 of one of said gears, depending upon the position of adjustment of said rod. The slide rod 233 is provided at its end with rack teeth 236 adapted to cooperate with mechanism, hereinafter more fully referred to, to automatically adjust the position of said rod. The gears 227, 228 and 229 respectively mesh with a series of gears 237, 238 and 239, keyed upon a shaft 240, journaled in the bearing frames 185 and 221 in cess 106 in the rod is adapted to yieldingly retain it in its normal position, and a set screw 107 engaging a slot 108 limits the extent to which it may be pulled out. In starting the machine the rod 100 is pulled out, removing the lever from engaging relation with the block 98, so that the plate 91 is rotated in counter-clockwise direction under the action of the spring 92, projecting the bolt 87 and connecting the indexing shaft. The lever 93 is further provided with an arm 109, which upon movement of the lever to index releasing position is moved into the path of the block 98, which latter engages said arm, and swings the lever 93 to re-set its end 97 in the path of said block, so that at the completion of a single revolution of the index shaft the same is automatically disconnected. An adjustable stop 110 is provided in the frame 96 for limiting the movement of the lever 93, through abutment with the arm 109. The present machine is adapted to have four indexing movements for each cycle, so that automatic means is provided to release the clutch during the cycle. For this purpose an arm 111 is secured upon the shaft 94 and is provided at its end with an adjustable contact screw 112 engaged by one end of a sliding push-rod 113 mounted in the frame 96, the other end of said rod having a cam surface 114 adapted during each work operation to be engaged by a cam lug 115 provided upon the tool feeding cam 245, hereinafter more fully referred to, the rod 113 being thus moved to automatically swing the lever 93 to clutch releasing relation.

Figure 4:
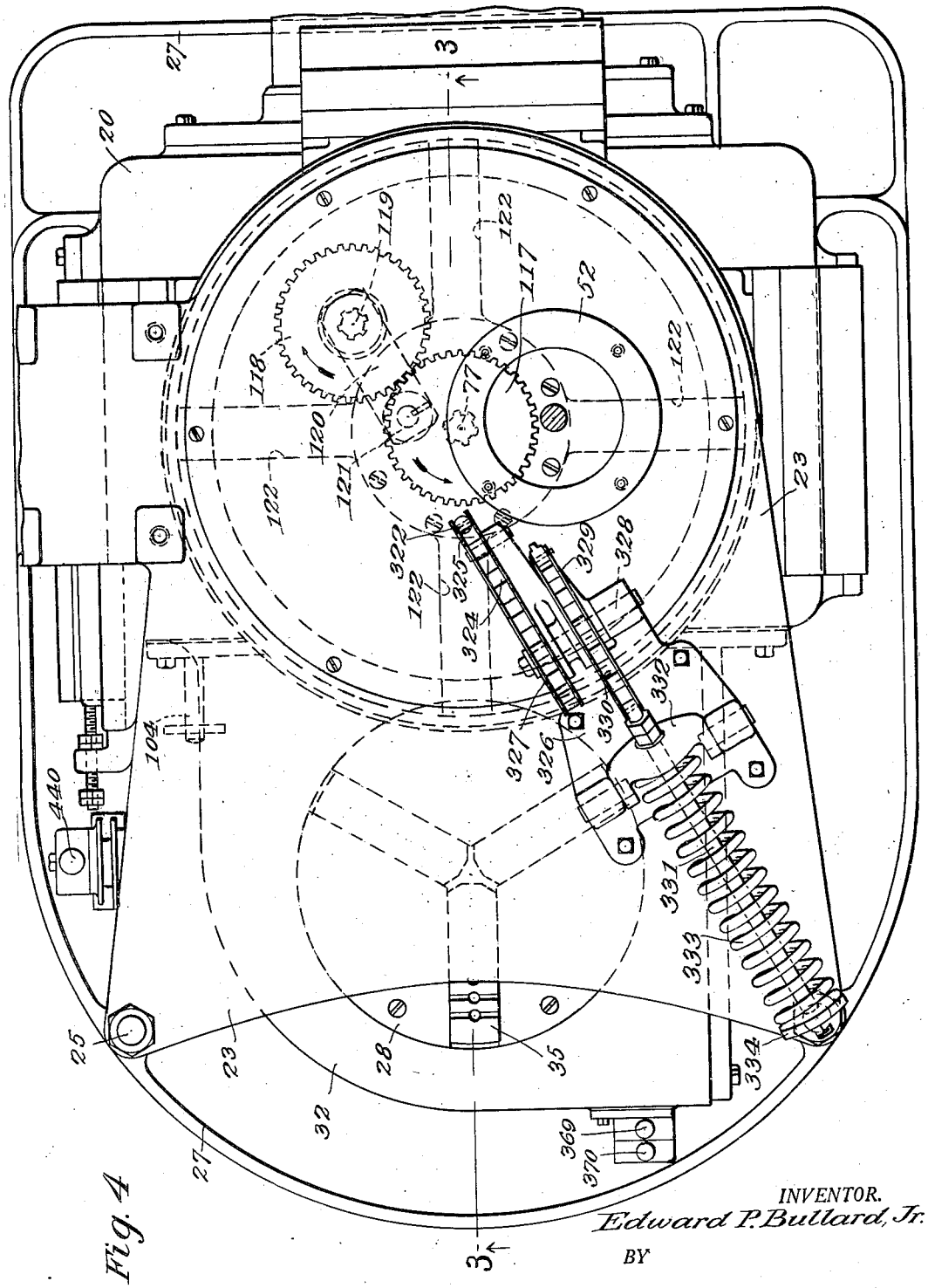
Fig. 4 is a sectional plan view, taken along the line 4—4 of Fig. 3.
Figure 9:
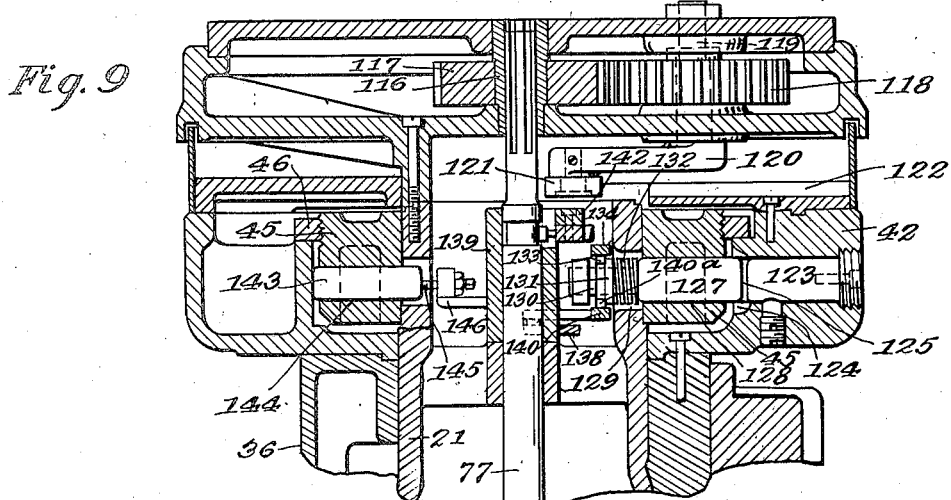
Fig. 9 is a vertical sectional view of the indexing and turret locking mechanism, and taken along the line 9—9 of Fig. 5.

The indexing shaft 77 is extended at its upper end into a bearing 116 in the head 23 (Figs. 3, 4 and 9), and is provided within the head with a gear 117 which meshes with a gear 118 secured upon a vertical shaft 119 journaled in the head and provided at its lower end with a crank arm 120 having a roller end 121 adapted to move successively into a series of four radial slideways or slots 122 provided upon the upper side of the indexing head 42, thereby rotating the tool carrying frame a quarter-turn during each indexing operation.

In order to rigidly fix the position of the tool carrying frame between each indexing operation, a series of four locking pins 123 (Figs. 5 and 9) are provided in the indexing head, their inner ends being disposed in recesses 124 in the inner periphery of the head, and provided with toothed portions 125, adapted to be engaged by the recessed end 126 of a bifurcated spring locking slide bolt 127, slidably keyed in a radial passage 128 of the collar 45. The inner end of the bolt 127 extends through an opening 129 in the pedestal 21 and is provided with a reduced diameter headed shank 130, upon which a flanged collar 131 is slidably engaged and pressed toward the headed end by means of a spring 132.

The collar 131 is engaged by a pin 133 provided on a lever 134 (Fig. 20) pivotally mounted at 135 in an opening 136 of the pedestal and is provided at its end with a roller 137 adapted to be engaged by a cam 138 provided upon a collar 139 secured upon the index shaft to press the locking bolt outwardly into locking relation with one of the pins 123. A lever 140 also pivotally mounted at 135 is provided at one end with a pin 140$^a$ opposed to the pin 133 and also engaging the collar 131 and is provided at its other end with a roller 141 adapted as the index shaft is rotated and the cam 138 disengaged from the roller 137, to be engaged by a cam 142, provided on the collar 139, to thereby retract the bolt 127 and release the index head.

At an angle of 120° to the bolt 127 there is provided a radial friction locking bolt 143 slidably keyed in a radial passage 144 of the collar 45, its outer end frictionally engaging the inner periphery of the index head, and its inner end being engaged by an adjustable contact screw 145, provided in a bell crank lever 146, mounted at 147 in a bearing support 148 of the pedestal 21, the end of this lever being provided with a yieldably mounted plunger 149, adapted to be engaged by a cam projection 150 on the collar 139 to press the bolt into tight frictional contact with the index head in the locked relation of the head, and to release it during the indexing operation.

Upon the lower end of the index shaft 77 there is keyed a pinion 151 (Fig. 12) meshing with an idler gear 152, and which in turn meshes with a gear 153 provided on a cam drum 154 rotatably mounted on a shaft 155. The driving ratio between the index shaft and the cam drum is 4 to 1, so that the drum is rotated once for each four revolutions of the index shaft, that is, once during a complete cycle of operation of the machine.

Figure 7:
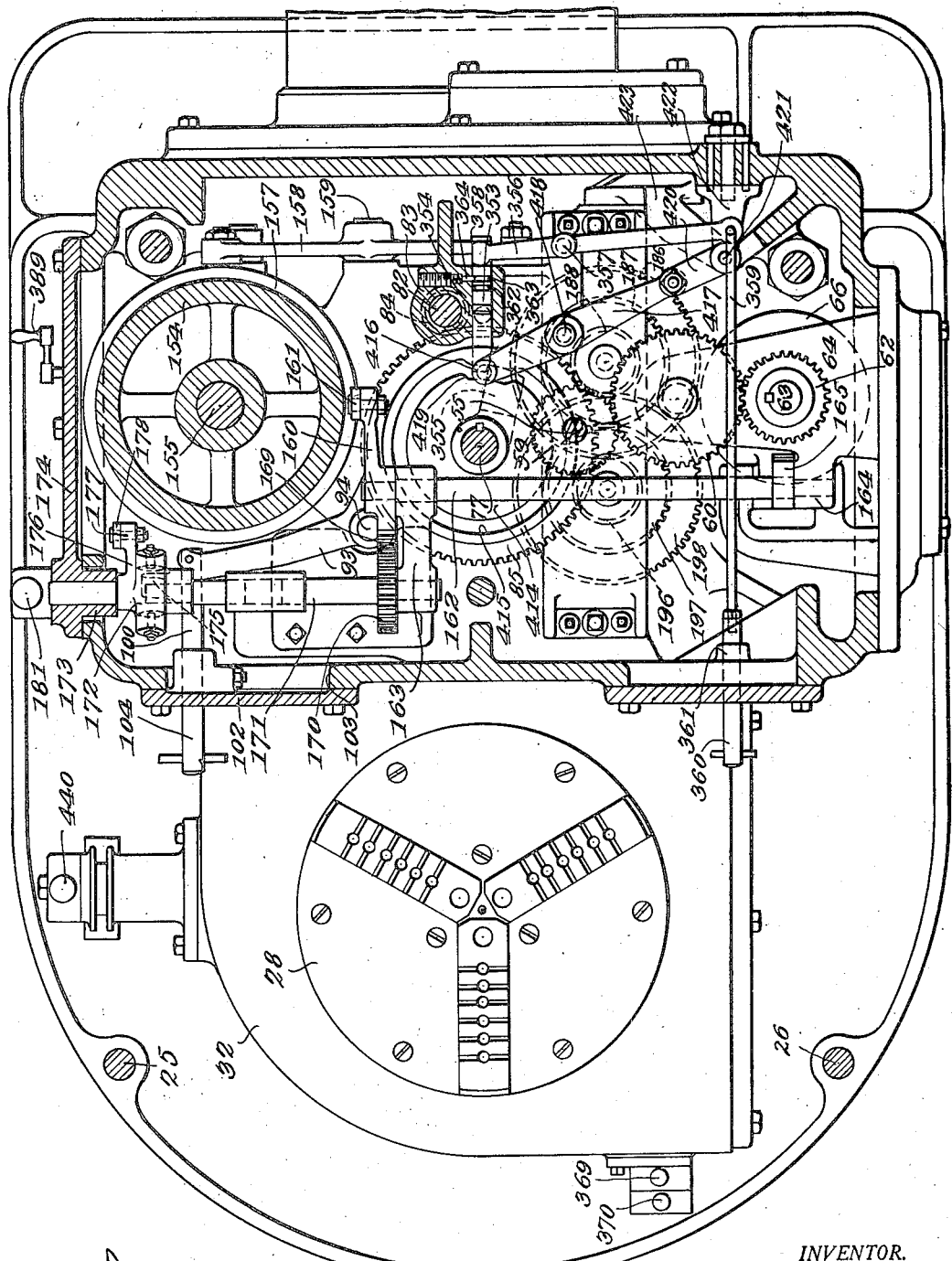
Fig. 7 is a sectional plan view taken along the line 7—7 of Fig. 3.

The cam drum 154 is provided with two cam grooves 156 and 157, the groove 156 adapted through a lever 158, mounted at 159 upon the frame, to position the speed control means of the work table and tool slide feed works for each tool operation, and the cam groove 157 adapted to automatically operate the main clutch 66. For this latter purpose a lever 160, (Fig. 7) having a rollered end 161 engaged in the cam groove 157, is mounted on the end of a shaft 162, having bearing at one end in a bearing bracket 163 and at its other end in a bearing 164 of the upper clutch bearing bracket 64. A segment gear 165 is secured upon the shaft 162 adjacent the bearing 164 and meshes with a segment gear 166 (Fig. 8) provided on a yoke 167, journaled in a bearing bracket 168, and engaged with the clutch. The cam groove 157 has three rises 157$^a$ in relation to the three axial alignment with the fast speed clutch 216, and provided at its inner end with a clutch member 241, this latter being the variable slow speed drive for the tool slides.

The worm shaft 242 is mounted in the frame between the fast and slow speed clutch members 216 and 241 which are loosely mounted upon the ends of said shaft, and is provided with a worm 243 meshing with a worm gear 244 provided on a barrel cam 245, keyed upon a vertical shaft 246, journaled in an upper bearing 247 of the frame 185 and in a lower roller bearing 248, this cam being provided with a cam groove 249, engaged by a roller 250 provided at the lower end of a vertically reciprocating tool slide operating rod 251, and adapted, as will hereinafter more fully appear, to impart movement to the tool slides. Upon the worm shaft, and at each side of the worm, there are slidably keyed clutch collars 252 and 253, adapted to be respectively engaged with the clutch members 216 and 241, these collars being controlled by automatic shifting means, hereinafter more fully referred to, to connect the worm shaft to the fast and slow speed drives at predetermined points.

To the end of the lever 158, which as before pointed out is adapted to be actuated by the cam groove 156 of the cam 154, there is pivotally connected the upper end of a vertically reciprocating control rod 254, and at its lower end there are provided rack teeth 255 which mesh with a gear 256 (Figs. 10 and 11), mounted on one end of a shaft 257, journaled in a bearing bracket 258, and upon the other end of which shaft there is secured a pinion 259 (Figs. 10 and 12), which meshes with the rack teeth 195 and 236 of the selective key actuating slide rods 192 and 233, and whereby these slide rods are synchronously moved, as the cam 154 successively assumes its several control positions, to directly relate the particular speed of the work table with the particular speed of the slow or working speed drive for the tools.

The automatic fast and slow speed clutch actuating means is also controlled by the rod 254 in synchronism with the work table and tool speed control. For this purpose the rod 254 is provided with rack teeth 260, which mesh with a segment gear 261 mounted upon one end a shaft 262, and upon the other end of which a segment gear 263 is secured and meshes with a rack 264 slidably mounted in a support 265, and swively connected at 266 to a shaft 267 slidably keyed at one end in the hub 268 of a clutch actuating lever arm 269 mounted in a bearing 270. The other end of said shaft is slidably mounted in a bearing 271 of a cam mounting frame 272, and a cam actuated arm 273 is secured upon the shaft within said frame. The sliding movement of the shaft, imparted thereto by the rod 254, is adapted to selectively position the arm 273 in relation to any one of a series of rotary clutch control cams 274, 275, and 276. These cams are keyed upon a shaft 277 journaled in bearings 278 and 279 of the frame, and having a gear 280 secured upon its end, and adapted to be driven from the tool slide feeding cam shaft 246.

For this purpose a bevel pinion 281 is secured upon the lower end of said shaft 246 and meshes with a bevel pinion 282 secured upon one end of a horizontal shaft 283 journaled in bearings 284 and 285 of the frame, and upon the other end of which a gear 286 is secured which meshes with the gear 280.

The arm 269 is connected to a link bar 287 which is connected at one end to the end of a lever arm 288 secured upon one end of a shaft 289 journaled in a bearing bracket 290, and upon the other end of this shaft there is secured an arm 291. The arm 291 is provided at its upper end with a roller 292 engaging a vertical slot 293 provided in the front face of a block 294 secured upon a slide rod 295 slidably supported in bearings 296 and 297, said block having a V-shaped or arrow-point under surface 298 adapted through movement in one or the other direction to actuate the clutch shifting mechanism with a snap action. The clutch shifting mechanism consists of a lever 299, pivotally mounted at 300, and having a yoke end 301 engaged with the slow speed clutch collar 253, and a lever 302 pivotally mounted at 303 and having a yoke end 304 engaged with the clutch collar 352, the two levers being connected by a link 305, so that they move in unison to shift one of the clutch collars into place as the other is disengaged.

The lever 299 has a spring pressed plunger 306 mounted within a passage 307 provided therein, and at the upper end said plunger is provided with a roller 308 engaged with the V-shaped surface 298 of the block 294. The levers are thus shifted with a snap action as the block is moved in one or the other directions, the plunger moving to one side or the other of the V-surface as it passes over the apex. An index pointer 277ª at the end of the control cam shaft 277 moves over a dial 277ᵇ and gives a visual indication of the position of the slide.

Mechanism, hereinafter more fully referred to, is also provided for neutralizing the clutches both during the automatic operation of the machine, and when the tool slides are hand operated, the mechanism for this latter purpose being also hereinafter more fully referred to.

Figure 2:
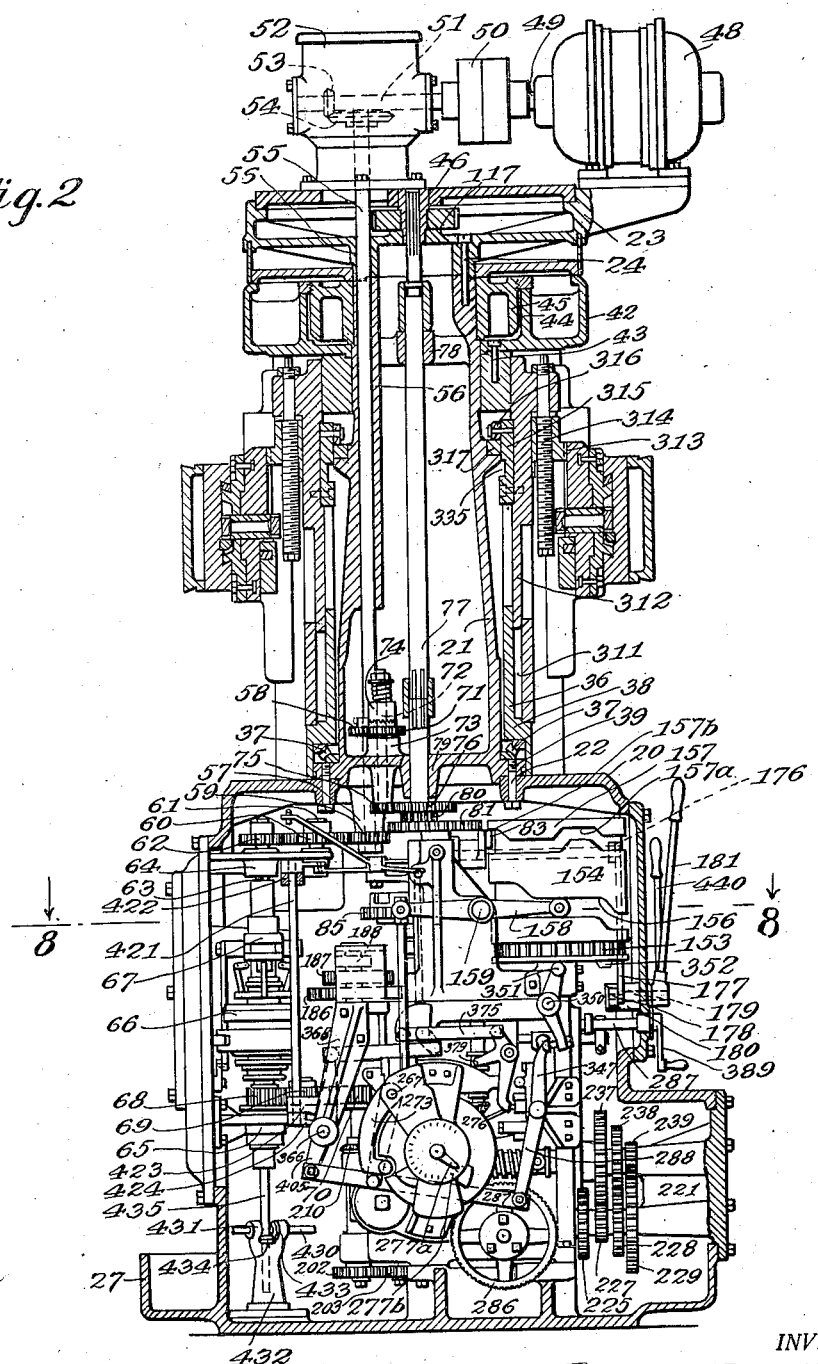
Fig. 2 is a vertical sectional view looking from the rear.

The rotatable tool carrying frame, in the present embodiment, has four sides and upon three of these the tool slides are mounted, the fourth side being the loading and unloading station, brought into relation with the work table at the end of each cycle, and being provided with an opening 309 covered by a removable plate 310 to permit access to the interior of the tool carrying frame. Upon each of the other three slides there are provided vertical slide-ways 311, in which the tool slides 312 are mounted for vertical reciprocation, the tool holders 313 being connected for vertical adjustment to the slides by screw supports 314. As shown in Fig. 2 each of the slides carries two tool supports one adapted for vertical movement and the other for horizontal or other angular movement, the latter movement being imparted through cooperating connection with the vertical movement. This mechanism, per se, is not part of the present invention, so that no further illustration or description is deemed necessary. Obviously any desired arrangement of tools may be provided, depending upon the particular work being done.

At the inner side of each tool slide there is secured a block 315, provided with a roller 316 adapted in the inoperative relations of the slides to ride upon an annular ledge 317 provided upon the pedestal 21, and which serves to support the slides as the frame is indexed.

As one of the slides is indexed into operating position, the roller moves into relation with an opening or recess 318 in the ledge, and rests upon the upper flanged end 319 of a counter-weight slide 320 engaged in a vertical slide way 321 in line with the recess 318. This slide is connected at its upper end to a vertical rod 322 slidable in a passage 323 in the pedestal 21 and head 23, and at its upper end is connected to a sprocket chain 324 extended over a sprocket gear 325 mounted in the frame 326 of the counter-weight mechanism. The end of the chain 324 is extended over and connected to a roller lever arm 327 secured upon a transverse shaft 328 journaled in the frame 326, and there is also secured upon the shaft a lever arm 329 connected to one end of a chain 330, the other end of which is connected to a rod 331 slidable in a pivotally mounted plate 332, and normally pulled outwardly by means of a spring 333 engaged on the rod between an end washer 334 thereon and the plate 332.

The block 315 is also provided with a transverse slot 335 adapted to engage a lug 336 provided upon the upper end of the tool feeding rod 251, as the slide is brought into operating relation. This slot 335, it will be noted, is wider than the recess 318 and the flange 319 of the counter-weight slide, so that it engages the lug 336 before the roller 316 leaves the ledge and is supported by the counter-weight, and remains in engagement with said lug 336 at the start of the next indexing operation until after said roller moves from the counter-weight to the ledge. This insures proper engagement and disengagement of the feed works in relation to the slides.

As above pointed out the feed works is adapted to be automatically neutralized, this action occurring at one point in each of the tool operations of the cycle. This is at the upper or return end of the movement of the rod 251, the tool slide being in its high position. For this purpose a lever 337 is mounted at the side of the clutch lever 299 upon a vertical pivot shaft 338 supported in lugs 339 and 340 formed upon the lever 299, one arm of said lever 337 being provided at its end with a pin 341, and the other arm being provided with a spring pressed plunger 342 bearing against the frame and adapted to yieldably press said pin toward the cam 245. At one point upon the cam there is secured a cam block 343 having a rise 344, a depressed neutralizing portion 345, and a stop lug portion 346. The cam block 343 functions at the end of the return upward feed of the tool slides to neutralize the traverse and feed clutches 252 and 253, the spring pressed plunger 306 being on the feed side of the V-surface 298 of the arrow-point block 294. This action will presently be more fully explained. Rotation of the cam 245 is thus stopped, the lug portion 346 abutting the pin 341 and preventing any coasting or momentum movement of the cam. The feed works tool speed control cams 274, 275 and 276, being driven by the cam 245, are inoperative to throw in the traverse clutch 252 at the beginning of the next tool operation, and means are therefore provided for tripping the clutch mechanism into traverse, to thereby start operation of the feed works.

For this purpose the lever 288 is provided with an upwardly extending arm 347 adapted to contact at its upper end with an adjustable set screw 348 provided in one end of a bell-crank lever 349 pivotally mounted on the frame at 350, and having a roller 351 at its other end engaged with the under side of the cam 154, and adapted at the end of each quarter-turn, corresponding to the three tool operating positions to be engaged by one of three projecting cam lugs 352 provided on the under side of the cam 154, to thereby swing the lever 349 and rotate the arm 347 and the lever 291 carried upon the shaft 289 in counter-clockwise direction. This movement shifts the arrow-point block 294 from the feed position indicated in full lines in Fig. 11 to the traverse position indicated in dotted lines. The pivoted arm 337 of the lever 299 being held down upon the cam block 343, by engagement of the plunger 306 at the feed side of the arrow-point block 294, now moves upwardly away from the block 294 through engagement of the plunger 306 at the traverse side of the arrow-point and consequent swinging in clockwise direction of the lever 299, thus releasing the arm 337 from the stop lug 346 and engaging the traverse clutch 252. The cam 245 now starts to rotate, moving the tool slide downwardly toward the work in traverse. Rotation of the cam 245 imparts rotation to the cams 274, 275 and 276, one of which, depending upon the shifted position of the lever arm 273, automatically controls the operation of the feed and traverse clutches 252 and 253 during the particular tool operation.

In Figs. 10, 13, 14 and 15 the cams 274, 275 and 276 are shown in detail, the same being of similar construction, but having adjustable cam blocks, whereby the points at which the clutches are tripped into feed and traverse may be adjusted, as desired, for each tool operation. As shown in Fig. 15, each cam is provided at one point with a recess 450 in relation to which the pin end 451 of the lever 273 is disposed in the stopped position, these recesses of the several cams being in alignment to permit shifting movement of the arm 273 into relation with any one of the cams, the pin end 451 passing through these recesses during the shifting movement. Upon the face of each cam there are provided annular channels 452 and 453, in the latter of which there is adjustably secured a feed tripping cam block 454. A traverse tripping cam block 455 is adjustably secured in the channel 452, and in the channel 453, and at a point corresponding to the end of the traverse return feed of the tool slide, there is adjustably secured a return cam block 456, adapted to trip the arm 273 from traverse to feed. A return feed lock cam block 457 is secured in the channel 452 in opposed relation to the return cam block 456, to prevent any possibility of manual tripping to feed at this point in the return traverse. At the start of the tool operation the arm 273 is in the full line feed relation as shown in Fig. 15, the cam grooved 157ª of the cam 154 having operated to connect the main feed works clutch 66, and the cam groove 156 having operated to position said arm 273 in its properly shifted relation to the cam 274, 275 or 276 for the particular tool operation. Before the cam 154 comes to rest one of the projecting cam lugs 352 upon its under side engages the bell-crank lever 349, and, as above pointed out, moves the arrow-point block 294 from feed to traverse position, connecting the traverse clutch 252, releasing the arm 337 from the stop lug 346, and moving the lever arm 273 to the traverse position indicated in dotted lines in Fig. 15. The feed works cam being driven from the shaft 246 of the cam 245, now starts to rotate, and, as the tool slide reaches a point in its down feed where the tools come into relation with the work, the feed cam block 454 engages the pin 451, shifting the arm 273 to feed position, disconnecting the traverse clutch 252 and connecting the feed clutch 253. The machine continues to operate in this relation during the down feed of the tool slide in engagement with the work, and at the end of the down feed the traverse cam block 455 engages the pin 451 and trips the arm 273 to traverse position, disengaging the feed clutch 253 and engaging the traverse clutch 252. The parts remain in this position until the cam 245 reaches a point where the cam block 343 carried thereby is directly beneath the raised end of the arm 337 of the lever 299, and thereupon the return cam block 456 engages the pin 451 moving the arm 273 to feed position, the arrow-point block 293 being shifted from traverse to feed position, and the lever 299 moving in feed direction. The block 344 being in the path of the arm 273, however, interrupts this movement in feed direction at a point which neutralizes both the feed and traverse clutches, the spring pressures of the plunger 306 of the lever 299 upon the feed side of the arrow-point block retaining the parts in this position. The feed works are now at rest, the tool slide is raised, and the machine is indexed to the next tool position. The return feed lock cam block 457 prevents manual tripping of the clutches at the point in the rotation of the cam 245 where the cam block 344 might jam the arm 337.

In order to lock the indexing mechanism, and the cycle controlling cam 154, when it is desired to adjust or manually control the movement of the feed works, a cycle safety mechanism is provided. This consists of a slide 353 mounted in a passage 354 in the frame portion 83, and adapted to be projected and retracted into and out of relation with a boss 355, formed upon the plate 91 of the index clutch, by means of a lever 356 pivoted upon the frame at 357, engaged at one end in a slot 358 in the outer end of the slide 353, and connected at its other end with a rod 359, provided at its forward end with a manually operable handle 360 slidable in a bearing 361 of the frame. The slide is provided with two spaced grooves 362 and 363 adapted to be engaged by a spring pressed plunger 364 to yieldably retain the slide in either its projected or retracted positions. By pressing in the handle 360 the slide is projected into the path of the boss 355, thereby stopping rotation of the plate 91, and through the lever 90 withdrawing the locking bolt 87 from the flange 89 of the gear 85 and disconnecting the index shaft and control cam from the main drive. The indexing mechanism and control cam will thus remain locked until the slide is manually withdrawn.

The mechanism for hand operating the tool slides will now be described. An elongated sleeve 365 is rotatably mounted upon an elongated shaft 366, the sleeve being journaled at its outer end in a bearing 367 of the base, and the shaft, which projects at its inner and outer ends with respect to the sleeve, being journaled at its inner end in a bearing bracket 368. Upon the outer end of the sleeve there is secured an operating hand lever 369, and upon the outer end of the shaft there is secured a hand lever 370, this latter lever adapted to be operated to manually trip the feed works clutches, as will be hereinafter more fully pointed out.

Upon the inner end of the sleeve there is secured a lever arm 371 which is connected at its upper end by a link 372 to a cam lever 373, pivotally mounted upon the frame at 374, and connected by a link 375 to a lever 376 pivotally mounted at 377 upon the frame. The lever 376 is provided with an arm 378 having a rollered end 379 engaging a flanged collar 380 provided upon a vertically movable shaft 381, having bearing below the roller in a bearing portion 382 of the frame, and being slidably keyed at its upper end in the hub 383 of a bevel gear 384 mounted in a bearing 385. The bevel gear 384 is engaged by a bevel pinion 386 provided at the inner end of a shaft 387, having bearing in the feed works and in a bearing 388 in the base, and provided at its outer end with a hand crank 389. Upon the lower end of the shaft 381 there is provided a bevel pinion 390, adapted upon downward movement of said shaft to be engaged with the bevel gear teeth 391 of a spur gear 392 loosely rotatable upon the inner end of the shaft 212, and meshing with a spur gear 393 secured to the cam driving worm 243. With the pinion 390 thus engaged with the bevel gear 391 through movement of the hand lever 369, the worm 343 may be hand operated by turning the crank 389, and through movement of the cam 245 the tool slides will be manually moved to any desired position. Obviously the power feed clutches 216 and 253 must be neutralized during this operation, and the mechanism for doing this—and also operated by the hand lever 369—will presently be described. The indexing mechanism is also automatically locked during this operation, and for this purpose the lever 373 is provided with a cam portion 394, upon which rests the lower end of a vertically movable slide rod 395 engaged in a vertical passage 396 of the frame portion 83, and provided at its upper end with a bevel end 397 engaged in a bevel ended slot 398 in the cycle safety index locking slide 353. Upon movement of the lever 373 through actuation of the hand lever 369 to manual operation position, the slide rod 395 is pressed upwardly, its bevel end moving the locking slide 353 into its projected index locking position in the path of the boss 355, so that the indexing mechanism is locked during the hand operation of the slides.

In order to neutralize the power feed clutches during the hand operation, a channelled cam lever 399 is secured upon the shaft 377 of the lever 376, and is engaged by a roller 400 provided upon an arm 401 of the lever 299, and adapted as the lever 376 is moved into position to lower the shaft 381 to press the lever 299 into neutral position thus disconnecting the clutches 216 and 253. The lever 376 is further provided with an arm 402, adapted to engage an adjustable set screw 403, provided in the end of the automatic neutralizing lever 337, and move said lever outwardly as shown in Fig. 14 out of cooperative relation with the cam block 343. The cam block is provided with a ledge 404 onto which the pin end 341 of the lever 337 moves when the cam 245 has been automatically stopped through the automatic neutralizing of the feed works, thereby preventing the tendency of the lever 299 to move toward feed position.

The mechanism for manually tripping the feed works clutches will now be described, the purpose of this mechanism being to enable the operator, when testing or adjusting the machine, to throw in either the fast or slow speed drive at will, without the necessity of waiting for the automatic change through the cams 274, 275 and 276. Upon the inner end of the shaft 366 (Figs. 16 and 17) there is provided a lever arm 405 pivotally connected to an extension 406 of the link 287, so that upon manual movement of the arm 405 the clutch shifting mechanism will be shifted in exactly the same manner as by the automatically operated arm 269. At one point in the indexing operation of the machine, it would be possible to jam or break the same, if the clutches were shifted by hand, so that, in order to avoid this condition, automatic means are provided to disconnect the hand lever 370 at this point. For this purpose a toothed clutch collar 407 is secured upon the shaft 366 and is engaged by a toothed clutch flange 408 of a clutch sleeve 409 loosely rotatable on the shaft 366, and slidably keyed at 410 within the hub of the lever arm 405. A flanged collar 411 is loosely mounted on the sleeve and is normally pressed against a collar 412 secured upon the sleeve by means of a coil spring 413, provided on the sleeve between the clutch flange 408 and the flanged collar 410, and adapted to normally press the clutch teeth into locking relation.

Upon movement of the collar to the right the clutch teeth will be separated and the shaft 366 thereby disconnected from the lever arm 405. This movement is adapted to be automatically imparted by the indexing mechanism at the dead point where it is desired to prevent hand tripping of the clutches, and for this purpose a cam disc 414 is keyed upon the index shaft 77, and is provided with a cam groove 415 engaged by the rollered end 416 of a lever 417 pivotally mounted on the frame at 418, the cam groove having a rise 419 at one point adapted to oscillate said lever. The lever is pivotally connected at its outer end to an arm 420 secured upon the upper end of a vertical shaft 421 mounted in bearing bracket portions 422 and 423, and provided at its lower end with an arm 424 provided with a pin 425 engaged in the flanged collar 411, and adapted as the lever 417 is moved by the cam rise 419 to separate the clutch members 407 and 408, and thereby render the hand lever 370 inoperative. In order to yieldably retain the shaft 366 in a relatively fixed position, the same is provided with a depending pin 426 extended through a circumferential slot 427 in the sleeve 365, and connected by a spring 428 to a bracket 429.

The chuck jaws 35 of the work table are adapted to be power operated by mechanism provided in the casing 33, but inasmuch as this forms no part of the present invention it will not be described in detail, except as to its driving connection. A horizontal drive shaft 430, which is adapted to drive the chuck mechanism, has bearing at one end in the casing 33 and at its other end in bearings 431 of the oil pump frame 432, and is provided with a bevel pinion 433 meshing with a bevel pinion 434 provided upon an extension shaft 435 of the main clutch shaft 63. The shaft extension 435 extends into the pump casing, and is adapted to drive the oil pump which through connections (not shown) forces oil to various parts of the machine. The chuck mechanism is adapted to be hand controlled to open and close the chuck jaws, and for this purpose is provided with a lever arm 436, connected by a link 437 to an arm 438 provided on one end of a horizontal shaft 439, a hand lever 440 being provided upon the other end of this shaft.

The operation of the machine is as follows; the same being in the work unloading and loading relation shown in Fig. 1:—The safety cycle handle 360 is pulled out to release the automatic indexing mechanism, if said handle has previously been pushed in to permit hand operation, although it is usually pulled out or inoperative during the normal automatic operation of the machine. The starting handle 104 is now pulled out, and through movement of the lever 93 the clutch plate 91 of the indexing mechanism is released, connecting the index shaft 77 to the main drive and indexing the tool carrier, the shaft being stopped at the end of a single revolution through engagement of the end 97 with the block 98 of the plate 91. During the single rotation of the index shaft the cam 154 is rotated through a quarter-turn by means of the pinion drive 151, this movement of the cam setting the feed works gearing through movement of the lever 158, positioning the driving keys 189 and 230 for the related driving speed of the work table and tool slides, and also positioning the traverse and feed clutch tripping arm 273 in relation to the particular cam 274, 275 or 276 for the first tool slide. Also during this movement of the cam 154 the main drive clutch 66 of the feed works is connected through actuation of the lever arm 160. The indexing movement of the tool carrier brings the first tool slide into relation with the tool slide feed rod 251, and thereupon the feed works is tripped into traverse by engagement of the cam lug 352 with the lever 349, operation of the feed works moving the tools into and out of relation with the work. At the end of the first tool operation the feed works are automatically neutralized as above pointed out, but just previous to stoppage of the cam 245 the cam lug 115 carried thereon engages the slide rod 113 and automatically trips the lever 93 to release the index mechanism. The next tool is thereby brought into operative relation, the cam 154 being rotated another quarter-turn, this movement setting the feed works for the next operation and at the same time first disconnecting the main clutch 66, through the lever 160, so that it is stopped during the setting operation, and then connecting said clutch to start the feed works.

The same operation occurs during the next or third tool operation.

The final indexing operation of the cycle brings the blank portion of the tool carrier into relation with the work, and at this point the machine is automatically stopped, the cam groove 157 of the cam 154 being so designed that the main drive clutch of the feed works is not connected during this final indexing operation. The finished work is removed from the chucks of the work table and a new piece put into place, and the next cycle of operation is started by pulling out the handle 104.

In order to stop the indexing operation at any time, the cycle safety handle 360 is pushed in, moving the slide 353 into the path of the boss 355 of the index clutch plate 91. This will stop indexing of the tool carrier, the machine continuing to operate however to the end of the tool operation in progress at the time the cycle safetly handle is operated. The feed works may be stopped at any time by operation of the main clutch operating handle 181. When it is desired to manually adjust the position of the tool slides the handle 369 is first operated to neutralize the feed works and engage the bevel pinion 390 with the bevel gear 391, and thereupon the hand crank 389 may be turned to rotate the tool slide feeding cam 245 in either direction and to any desired position. The feed works clutches may be manually tripped by operation of the hand lever 370, without waiting for the automatic tripping, this being desirable in adjusting and setting the machine.

While the machine will be normally operated with the several tool slides operating automatically throughout the cycle, the locking and control mechanism is such that any one of the slides may if desired be operated individually by the automatic feed works, or it may be hand operated.

I have illustrated and described a preferred and satisfactory embodiment of the invention, but it will be obvious that changes may be made therein within the spirit and scope thereof, as defined in the appended claims.

Having thus described my invention what I claim and desire to secure by Letters Patent is:—

1. In an automatic machine tool, a rotary work carrying table, changeable means for rotating said table at selective rates of speed, a tool slide, means for feeding said tool slide at selective rates of feed each individually related to a particular rate of rotation of the work table and means adapted to automatically change the tool slide selective speed feed means as said work table selecting speed rotating means is changed and whereby a particular speed of the work table is selectively related to a particular speed of the table slide.

2. In an automatic machine tool, a rotary work carrying table, a rotary tool carrying support rotatable about an axis parallel to the work table axis, a plurality of tool slides carried by said support, means for indexing said support to bring said slides successively into operative relation with said work table, and feeding means adapted to cooperate with said tool slides in their operative relation to feed the tools into and out of relation with the work, means for actuating said indexing means during a complete cycle, and stopping the same at the end of the cycle.

3. In an automatic machine tool, a rotary work carrying table, a rotary tool carrying support rotatable about an axis parallel to the work table axis, a plurality of tool slides carried by said support, means for indexing said support to bring said slides successively into operative relation with said work table, and feeding means adapted to cooperate with said tool slides in their operative relation to feed the tools into and out of relation with the work, automatic means for actuating said indexing means during a complete cycle, and stopping the same at the end of the cycle.

4. In an automatic machine tool, a rotary work carrying table, a rotary tool carrying support rotatable about an axis parallel to the work table axis, a plurality of tool slides carried by said support, means for indexing said support to bring said slides successively into operative relation with said work table, and feeding means adapted to cooperate with said tool slides in their operative relation to feed the tools into and out of relation with the work, automatic means for actuating said indexing means during a complete cycle, and stopping the same at the end of the cycle, and manually operable means for releasing said indexing means at the beginning of the cycle.

5. In an automatic machine tool, a rotary work carrying table, a rotary tool carrying support rotatable about an axis parallel to the work table axis, a plurality of tool slides carried by said support, means for indexing said support to bring said slides successively into operative relation with said work table, and feeding means adapted to cooperate with said tool slides in their operative relation to feed the tools into and out of relation with the work, means for actuating said indexing means during a complete cycle, and stopping the same at the end of the cycle, and manually operable means for rendering said indexing means inoperative at any point in the cycle.

6. In an automatic machine tool, a rotary work carrying table, a rotary tool carrying support, a plurality of tool slides carried by said support, means for indexing said support to bring said slides successively into operative relation with said work table, means for feeding said tool slides at selective rates of speed into and out of relation with the work, and means adapted during said indexing to operatively relate said last mentioned means for the selective rate of speed for the succeeding tool operation.

7. In an automatic machine tool, a rotary work carrying table, means for rotating said table at selective rates of speed, a rotary tool carrying support, a plurality of tool slides carried by said support, means for indexing said support to bring said slides successively into operative relation with said work table, means for feeding said tool slides into and out of rotation with the work, and means adapted during said indexing to operatively relate said first mentioned means and said last mentioned means for the selective rate of speed for the succeeding tool operation.

8. In an automatic machine tool, a rotary work carrying table, a rotary tool carrying support rotatable about an axis parallel to the work table axis, a plurality of tool slides carried by said support, means for indexing said support to bring said slides successively into operative relation with said work table, feed works for said tool slides including a series of vari-speed gears for driving said tool slides at selective rates of speed, and means cooperating with said indexing means for automatically connecting said gears individually with respect to the individual tool slides.

9. In an automatic machine tool, a rotary work carrying table, a tool slide, feed works for said tool slide including a cam for lowering and raising said tool slide into and out of relation with said work carrying table, traverse speed drive means for said cam, feed speed drive means for said cam, clutch means for connecting said traverse and feed drive means, cam means for automatically controlling said clutch means, and means adapted to automatically neutralize said clutches at the end of the upward feed of said tool slide.

10. In an automatic machine tool, a rotary work carrying table, a tool slide, feed works for said tool slide including a cam for lowering and raising said tool slide into and out of relation with said work carrying table, traverse speed drive means for said cam, feed speed drive means for said cam, clutch means for connecting said traverse and feed drive means, cam means for automatically controlling said clutch means, and manually operable means for actuating said clutch means independently of said cam means.

11. In an automatic machine tool, a rotary work carrying table, a tool slide, feed works for said tool slide including a cam for lowering and raising said tool slide into and out of relation with said work carrying table, traverse speed drive means for said cam, feed speed drive means for said cam, clutch means for connecting said traverse and feed drive means, cam means for automatically controlling said clutch means, and means adapted to automatically neutralize said clutches at the end of the upward feed of said tool slide, manually operable means for actuating said clutch means independently of said cam means, and manually operable means for neutralizing said clutch means independently of said automatic neutralizing means.

12. In an automatic machine tool, a rotary work carrying table, a tool slide, feed works for said tool slide including a cam for lowering and raising said tool slide into and out of relation with said work carrying table, traverse speed drive means for said cam, feed speed drive means for said cam, clutch means for connecting said traverse and feed drive means, cam means for automatically controlling said clutch means, and means adapted to automatically neutralize said clutches at the end of the upward feed of said tool slide, manually operable means for neutralizing said clutch means independently of said automatic neutralizing means, and manually operable means for actuating said tool slide cam.

13. In an automatic machine tool, a rotary work carrying table rotatable about a vertical axis, a plurality of tool slides adapted to be indexed, feed works for said work table and tool slide including a series of vari-speed gears for driving said work table at selective rates of speed, a series of vari-speed gears for driving said tool slides at selective rates of speed, and means for selectively connecting said gears to any one of said tool slides individually whereby a particular speed of the work table is selectively related to a particular speed of the tool slide.

14. In an automatic machine tool, a rotary work carrying table rotatable about a vertical axis, a plurality tool slides adapted to be indexed, feed works for said work table and tool slide including a series of vari-speed gears for driving said work table at selective rates of speed, a series of vari-speed gears for driving said tool slides at selective rates of speed, and means for simultaneously connecting selected gears of each of said series of gears to any one of said tool slides, whereby a particular speed of the work table is selectively related to a particular speed of the tool slide.

15. In an automatic machine tool, a rotary work carrying table rotatable about a vertical axis, a plurality of tool slides adapted to be indexed, feed works for said work table and tool slide including a series of vari-speed gears for driving said work table at selective rates of speed, a series of vari-speed gears for driving said tool slide at selective rates of speed, and means for simultaneously connecting selected gears of each of said series of gears to any one of said tool slides, whereby a particular speed of the work table is selectively related to a particular speed of the tool slide, traverse speed drive means for driving said tool slide at a given traverse speed and clutch means for connecting said traverse speed drive means and said vari-speed gears.

16. In an automatic machine tool, a rotary work carrying table rotatable about a vertical axis, a plurality of tool slides adapted to be indexed, feed works for said work table and tool slide including a series of vari-speed gears for driving said work table at selective rates of speed, a series of vari-speed gears for driving said tool slide at selective rates of speed, and means for simultaneously connecting selected gears to any one of said tool slides of each of said series of gears, whereby a particular speed of the work table is selectively related to a particular speed of the tool slide, traverse speed drive means for driving said tool slide at a given traverse speed clutch means for connecting said traverse speed drive means and said vari-speed gears, and cam means adapted to automatically control the actuation of said clutch means.

17. In an automatic machine tool, a rotary work carrying table, a rotary tool carrying support rotatable about an axis parallel to the work table axis, a plurality of tool slides carried by said support, means for indexing said support to bring said slides successively into operative relation with said work table, feed works for said tool slides including a single reciprocating means disposed in relation with said work table, said support adapted upon indexing to successively connect said tool slides with said reciprocating means, a cam for lowering and raising said reciprocating means, traverse speed drive means for said cam, feed speed drive means for said cam, and clutch means for connecting said traverse and feed drive means.

18. In an automatic machine tool, a rotary work carrying table, a rotary tool carrying support rotatable about an axis parallel to the work table axis, a plurality of tool slides carried by said support, means for indexing said support to bring said slides successively into operative relation with said work table, feed works for said tool slides including a single reciprocating means disposed in relation with said work table, said support adapted upon indexing to successively connect said tool slides with said reciprocating means, a series of vari-speed drive means for driving said reciprocating means at selective rates of speed, and means controlled by said indexing means for selectively connecting said vari-speed drive means individually.

19. In an automatic machine tool, a rotary work carrying table, a rotary tool carrying support rotatable about an axis parallel to the work table axis, a plurality of tool slides carried by said support, means for indexing said support to bring said slides successively into operative relation with said work table, feed works for said tool slides including a single reciprocating means disposed in relation with said work table, said support adapted upon indexing to successively connect said tool slides with said reciprocating means, a series of vari-speed drive means for driving said work table at selective rates of speed, a series of vari-speed feed drive means for driving said reciprocating means at selective rates of speed, and means controlled by said indexing means for simultaneously connecting selected elements of each of said series, whereby a particular speed of the work table is related to a particular speed of the tool slide.

20. In an automatic machine tool, a rotary work carrying table, a rotary tool carrying support rotatable about an axis parallel to the work table axis, a plurality of tool slides carried by said support, means for indexing said support to bring said slides successively into operative relation with said work table, feed works for said tool slides including a single reciprocating means disposed in relation with said work table, said support adapted upon indexing to successively connect said tool slides with said reciprocating means, a series of vari-speed drive means for driving said work table at selective rates of speed, a series of vari-speed feed drive means for driving said reciprocating means at selective rates of speed, and means controlled by said indexing means for simultaneously connecting selected elements of each of said series, whereby a particular speed of the work table is related to a particular speed of the tool slide, traverse speed drive means for driving said reciprocating means at a given traverse speed, and clutch means for connecting said traverse speed drive means and said vari-speed feed drive means.

21. In an automatic machine tool, a rotary work carrying table, a rotary tool carrying support rotatable about an axis parallel to the work table axis, a plurality of tool slides carried by said support, means for indexing said support to bring said slides successively into operative relation with said work table, feed works for said tool slides including a single reciprocating means disposed in relation with said work table, said support adapted upon indexing to successively connect said tool slides with said reciprocating means, a series of vari-speed drive means for driving said work table at selective rates of speed, a series of vari-speed feed drive means for driving said reciprocating means at selective rates of speed, and means controlled by said indexing means for simultaneously connecting selected elements of each of said series, whereby a particular speed of the work table is related to a particular speed of the tool slide, traverse speed drive means for driving said reciprocating means at a given traverse speed, clutch means for connecting said traverse speed drive means and said vari-speed feed drive means, and a series of control means for automatically actuating said clutch means, each of said control means being related to a particular indexing position.

22. In an automatic machine tool, a rotary work carrying table, a rotary tool carrying support rotatable about an axis parallel to the work table axis, a plurality of tool slides carried by said support, means for indexing said support to bring said slides successively into operative relation with said work table, feed works for said tool slides including a single reciprocating means disposed in relation with said work table, said support adapted upon indexing to successively connect said tool slides with said reciprocating means, a series of vari-speed drive means for driving said work table at selective rates of speed, a series of vari-speed feed drive means for driving said reciprocating means at selective rates of speed, and means controlled by said indexing means for simultaneously connecting selected elements of each of said series whereby a particular speed of the work table is related to a particular speed of the tool slide, traverse speed drive means for driving said reciprocating means at a given traverse speed, clutch means for connecting said traverse speed drive means and said vari-speed feed drive means, a series of control means for automatically actuating said clutch means, and means controlled by said indexing means for operatively connecting said control means individually and selectively, whereby a particular control means is related to a particular tool slide.

23. In an automatic machine tool, a rotary work carrying table, a rotary tool carrying support rotatable about an axis parallel to the work table axis, a plurality of tool slides carried by said support, means for indexing said support to bring said slides successively into operative relation with said work table, feed works for said tool slides including a single reciprocating means disposed in relation with said work table, said support adapted upon indexing to successively connect said tool slides with said reciprocating means, a series of vari-speed drive means for driving said work table at selective rates of speed, a series of vari-speed feed drive means for driving said reciprocating means at selective rates of speed, and means controlled by said indexing means for simultaneously connecting selected elements of each of said series, whereby a particular speed of the work table is related to a particular speed of the tool slide, traverse speed drive means for driving said reciprocating means at a given traverse speed, clutch means for connecting said traverse speed drive means and said vari-speed feed drive means, control means for automatically actuating said clutch means, and manually operable means for actuating said clutch means independently of said control means.

24. In an automatic machine tool, a rotary work carrying table, a rotary tool carrying support rotatable about an axis parallel to the work table axis, a plurality of tool slides carried by said support, means for indexing said support to bring said slides successively into operative relation with said work table, feed works for said tool slides including a single reciprocating means disposed in relation with said work table, said support adapted upon indexing to successively connect said tool slides with said reciprocating means, a series of vari-speed drive means for driving said work table at selective rates of speed, a series of vari-speed feed drive means for driving said reciprocating means at selective rates of speed, and means controlled by said indexing means for simultaneously connecting selected elements of each of said series, whereby a particular speed of the work table is related to a particular speed of the tool slide, traverse speed drive means for driving said reciprocating means at a given traverse speed, clutch means for connecting said traverse speed drive means and said vari-speed feed drive means, control means for automatically actuating said clutch means, manually operable means for actuating said clutch means independently of said control means, and means adapted to automatically render said manually operable means inoperative at a given point during each tool slide operation.

25. In an automatic machine tool, a rotary work carrying table, a rotary tool carrying support rotatable about an axis parallel to the work table axis, a plurality of tool slides carried by said support, means for indexing said support to bring said slides successively into operative relation with said work table, feed works for said tool slides including drive means adapted to automatically move said tool slides into and out of relation with the work, manually operable means for operating said tool slides independently of said drive means, and means associated therewith adapted to render said indexing means inoperative during the manual operation of said tool slides.

26. In an automatic machine tool, a rotary work carrying table, a rotary tool carrying support rotatable about an axis parallel to the work table axis, a plurality of tool slides carried by said support, means for indexing said support to bring said slides successively into operative relation with said work table, feed works for said tool slides including drive means adapted to automatically move said tool slides into and out of relation with the work, manually operable means for operating said tool slides independently of said drive means, manually operable means for rendering said indexing means inoperative at will, and means associated with said manual tool slide operating means adapted to actuate said last mentioned manually operable means to automatically render said indexing means inoperative during the manual operation of said tool slides.

27. In an automatic machine tool, a rotary work carrying table, a rotary tool carrying support rotatable about an axis parallel to the work table axis, a plurality of tool slides carried by said support, means for indexing said support to bring said slides successively into operative relation with said work table, feed works for said tool slides including drive means adapted to automatically move said tool slides into and out of relation with the work, manually operable means for operating said tool slides independently of said drive means, and means associated therewith adapted to render said automatic drive means inoperative during the manual operation of said tool slides.

28. In an automatic machine tool, a rotary work carrying table, a rotary tool carrying support rotatable about an axis parallel to the work table axis, a plurality of tool slides carried by said support, a drive shaft, means for indexing said support to bring said slides successively into operative relation with said work table, means driven by said drive shaft adapted to actuate said indexing means, clutch means for connecting said last mentioned means to said indexing means, manually operable means for initially connecting said clutch means, means adapted to disconnect said clutch means at the end of each indexing operation, and means driven by said drive shaft adapted to automatically connect said clutch means during a single complete cycle of operation of said several tool slides.

29. In an automatic machine tool, a rotary work carrying table, a rotary tool carrying support rotatable about an axis parallel to the work table axis and having a plurality of faces, one of said faces constituting a loading and unloading position, a plurality of tool slides carried by the other faces, a drive shaft, means for indexing said support to bring its faces successively into operative relation with said work table, means driven by said drive shaft adapted to actuate said indexing means, clutch means for connecting said last mentioned means to said indexing means, manually operable means for intially connecting said clutch means, means adapted to disconnect said clutch means at the end of each indexing operation, feed works for said tool slides and work table operatively connected to said drive shaft for operation during the tool operating positions of said support, and means actuated by said feed works adapted to automatically connect said clutch means at the end of each tool operation.

30. In an automatic machine tool, a rotary work carrying table, a rotary tool carrying support rotatable about an axis parallel to the work table axis and having a plurality of faces, one of said faces constituting a loading and unloading position, a plurality of tool slides carried by the other faces, a drive shaft, means for indexing said support to bring its faces successively into operative relation with said work table, means driven by said drive shaft adapted to actuate said indexing means, clutch means for connecting said last mentioned means to said indexing means, manually operable means for initially connecting said clutch means, means adapted to disconnect said clutch means at the end of each indexing operation, feed works for said tool slides and work table including a tool slide operating cam, means operatively connected to said drive shaft for operating said cam during the tool operating positions of said support, and means actuated by said cam adapted to automatically connect said clutch means at the end of each tool operation.

31. In an automatic machine tool, a rotary work carrying table, a rotary tool carrying support rotatable about an axis parallel to the work table axis, a plurality of tool slides carried by said support, a drive shaft, means for indexing said support to bring said slides successively into operative relation with said work table, means driven by said drive shaft adapted to actuate said indexing means, clutch means for connecting said last mentioned means to said indexing means, manually operable means for initially connecting said clutch means, means adapted to disconnect said clutch means at the end of each indexing operation, means driven by said drive shaft adapted to automatically connect said clutch means during a single complete cycle of operation of said several tool slides, and manually operable means adapted to render said indexing means inoperative at any point in the cycle.

32. In an automatic machine tool, a rotary work carrying table, a rotary tool carrying support rotatable about an axis parallel to the work table axis and having a plurality of faces, one of said faces constituting a loading and unloading position, a plurality of tool slides carried by the other faces, a drive shaft, means for indexing said support to bring its faces successively into operative relation with said work table, means driven by said drive shaft adapted to actuate said indexing means, clutch means for connecting said last mentioned means to said indexing means, manually operable means for initially connecting said clutch means, means adapted to disconnect said clutch means at the end of each indexing operation, feed works for said tool slides and work table including a tool slide operating cam, means operatively connected to said drive shaft for operating said cam during the tool operating positions of said support, means actuated by said cam adapted to automatically connect said clutch means at the end of each tool operation, and manually operable means for rendering said feed works inoperative, means actuated by said last mentioned means adapted to automatically render said indexing means inoperative, and manually operable means for operating said tool slides.

33. In an automatic machine tool, a rotary work carrying table, a rotary tool carrying support rotatable about an axis parallel to the work table axis and having a plurality of faces, one of said faces constituting a loading and unloading position, a plurality of tool slides carried by the other faces, a drive shaft, means for indexing said support to bring its faces successively into operative relation with said work table, means driven by said drive shaft adapted to actuate said indexing means, clutch means for connecting said last mentioned means to said indexing means, manually operable means for initially connecting said clutch means, means adapted to disconnect said clutch means at the end of each indexing operation, feed works for said tool slides and work table, a clutch for connecting said drive shaft to said feed works, and cam means operatively connected to said indexing means adapted to automatically connect and disconnect said clutch.

34. In an automatic machine tool, a rotary work carrying table, a rotary tool carrying support rotatable about an axis parallel to the work table axis and having a plurality of faces, one of said faces constituting a loading and unloading position, a plurality of tool slides carried by the other faces, a drive shaft, means for indexing said support to bring its faces successively into operative relation with said work table, means driven by said drive shaft adapted to actuate said indexing means, clutch means for connecting said last mentioned means to said indexing means, manually operable means for initially connecting said clutch means, means adapted to disconnect said clutch means at the end of each indexing operation, feed works for said tool slides and work table, a clutch for connecting said drive shaft to said feed works, cam means operatively connected to said indexing means adapted to automatically connect and disconnect said clutch, and manually operable means for actuating said clutch independently of said cam means.

35. In an automatic machine tool, a rotary work carrying table, a rotary tool carrying support rotatable about an axis parallel to the work table axis and having a plurality of faces, one of said faces constituting a loading and unloading position, a plurality of tool slides carried by the other faces, a drive shaft, means for indexing said support to bring its faces successively into operative relation with said work table, means driven by said drive shaft adapted to actuate said indexing means, clutch means for connecting said last mentioned means to said indexing means, manually operable means for initially connecting said clutch means, means adapted to disconnect said clutch means at the end of each indexing operation, feed works for said tool slides and work table, a clutch for connecting said drive shaft to said feed works, cam means operatively connected to said indexing means adapted to automatically connect and disconnect said clutch, said cam means adapted in the loading and unloading position of said support to permit independent actuating of said clutch, and manually operable means for actuating said clutch independently of said cam means.

36. In an automatic machine tool, a rotary work carrying table, a rotary tool carrying support rotatable about an axis parallel to the work table axis, a plurality of tool slides carried by said support, means for indexing said support to bring said slides successively into operative relation with said work table, feed works for said tool slides including a single reciprocating means disposed in relation with said work table, said support adapted upon indexing to successively connect said tool slides with said reciprocating means, a cam for lowering and raising said reciprocating means, traverse speed drive means for said cam, feed speed drive means for said cam, clutch means for connecting said traverse and feed drive means, and means driven by said cam for actuating said clutch means.

37. In an automatic machine tool, a rotary work carrying table, a rotary tool carrying support rotatable about an axis parallel to the work table axis, a plurality of tool slides carried by said support, means for indexing said support to bring said slides successively into operative relation with said work table, feed works for said tool slides including a single reciprocating means disposed in relation with said work table, said support adapted upon indexing to successively connect said tool slides with said reciprocating means, a cam for lowering and raising said reciprocating means, traverse speed drive means for said cam, feed speed drive means for said cam, clutch means for connecting said traverse and feed drive means, and means driven by said cam for actuating said clutch means, means driven by said cam for automatically actuating said clutch means, and means on said cam adapted to automatically neutralize said clutch means at the end of each tool operation.

38. In an automatic machine tool, a rotary work carrying table, a rotary tool carrying support rotatable about an axis parallel to the work table axis, a plurality of tool slides carried by said support, means for indexing said support to bring said slides successively into operative relation with said work table, feed works for said tool slides including a single reciprocating means disposed in relation with said work table, said support adapted upon indexing to successively connect said tool slides with said reciprocating means, a cam for lowering and raising said reciprocating means, traverse speed drive means for said cam, feed speed drive means for said cam, clutch means for connecting said traverse and feed drive means, and means driven by said cam for actuating said clutch means, means driven by said cam for automatically actuating said clutch means, and means on said cam adapted to automatically neutralize said clutch means at the end of each tool operation, manually operable means for actuating said clutch means independently of said actuating clutch operating means, and means adapted to automatically render said manually operable means inoperative at the point when said automatic neutralizing means is in operative relation.

39. In an automatic machine tool, a rotary work carrying table, a rotary tool carrying support rotatable about an axis parallel to the work table axis, a plurality of tool slides carried by said support, means for indexing said support to bring said slides successively into operative relation with said work table, feed works for said tool slides including a single reciprocating means disposed in relation with said work table, said support adapted upon indexing to successively connect said tool slides with said reciprocating means, a cam for lowering and raising said reciprocating means, traverse speed drive means for said cam, feed speed drive means for said cam, clutch means for connecting said traverse and feed drive means, and means driven by said cam for actuating said clutch means, means driven by said cam for automatically actuating said clutch means, and means on said cam adapted to automatically neutralize said clutch means at the end of each tool operation, and means adapted to be actuated by said indexing means adapted at the beginning of each tool operation to actuate said clutch means to connect said traverse drive means.

40. In an automatic machine tool, a rotary work carrying table, a rotary tool carrying support rotatable about an axis parallel to the work table axis, a plurality of tool slides carried by said support, means for indexing said support to bring said slides successively into operative relation with said work table, feed works for said tool slides including a single reciprocating means disposed in relation with said work table, said support adapted upon indexing to successively connect said tool slides with said reciprocating means, a cam for lowering and raising said reciprocating means, traverse speed drive means for said cam, feed speed drive means for said cam, clutch means for connecting said traverse and feed drive means, a series of control means driven by said cam for actuating said clutch means, and means actuated by said indexing means for operatively connecting said control means individually and selectively, whereby a particular control means is related to a particular tool slide.

41. In an automatic machine tool, a rotary work carrying table, a rotary tool carrying support rotatable about an axis parallel to the work table axis, a plurality of tool slides carried by said support, means for indexing said support to bring said slides successively into operative relation with said work table, feed works for said tool slides including a single reciprocating means disposed in relation with said work table, said support adapted upon indexing to successively connect said tool slides with said reciprocating means, a cam for lowering and raising said reciprocating means, a series of vari-speed drive means for driving said work table at selective rates of speed, a series of vari-speed feed drive means for driving said cam at selective rates of speed, and means controlled by said indexing means for simultaneously connecting selected elements of each of said series, whereby a particular speed of the work table is related to a particular speed of the tool slide, traverse speed drive means for driving said cam at a given traverse speed, clutch means for connecting said traverse speed drive means and said vari-speed feed drive means, a series of control means driven by said cam for actuating said clutch means, and means actuated by said indexing means for operatively connecting said control means individually and selectively, whereby a particular control means is related to a particular tool slide.

42. In an automatic machine tool, a rotary work carrying table, a rotary tool carrying support rotatable about an axis parallel to the work table, a pedestal having an annular support provided with an opening in relation to the work table, said tool slides being supported on said annular support in their inoperative relation, means for indexing said support to bring said slides successively into operative relation, feed works for said tool slides including a single reciprocating means disposed in relation with said work table and movable into relation with said opening of said annular support, said rotatable support adapted upon indexing to move said tool slides into and out of relation with said reciprocating means.

43. In an automatic machine tool, a rotary work carrying table, a rotary tool carrying support rotatable about an axis parallel to the work table, a pedestal having an annular support provided with an opening in relation to the work table, said tool slides being supported on said annular support in their inoperative relation, means for indexing said support to bring said slides successively into operative relation, feed works for said tool slides including a single reciprocating means disposed in relation with said work table and movable into relation with said opening of said annular support, said rotatable support adapted upon indexing to move said tool slides into and out of relation with said reciprocating means, and counter balance means disposed in relation to said opening and adapted to support said tool slides as the same move out of relation with said annular support.

44. In an automatic machine tool, a rotary work carrying table, a rotary tool carrying support rotatable about an axis parallel to the work table, a pedestal having an annular support provided with an opening in relation to the work table, said tool slides being supported on said annular support in their inoperative relation, means for indexing said support to bring said slides successively into operative relation, feed works for said tool slides including a single reciprocating means disposed in relation with said work table and movable into relation with said opening of said annular support, said rotatable support adapted upon indexing to move said tool slides into and out of relation with said reciprocating means, the connection between said tool slides and said reciprocating means being of greater extent than the connection between said tool slides and said counter balance means, whereby the tool slides come into relation with said reciprocating means before, and move out of relation after, their operative relation with said counter balance means.

Signed at Bridgeport, in the county of Fairfield and State of Connecticut, this 27th day of February, A. D. 1928.

EDWARD P. BULLARD, Jr.